(12) United States Patent
Hashimoto et al.

(10) Patent No.: US 6,480,639 B2
(45) Date of Patent: *Nov. 12, 2002

(54) OPTICAL MODULE

(75) Inventors: Toshikazu Hashimoto, Tokyo (JP);
Yasufumi Yamada, Tokyo (JP);
Masahiro Yanagisawa, Tokyo (JP);
Kuniharu Kato, Tokyo (JP); Yasuyuki Inoue, Tokyo (JP)

(73) Assignee: Nippon Telegraph and Telephone Corp. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/158,090

(22) Filed: Sep. 22, 1998

(65) Prior Publication Data

US 2002/0001427 A1 Jan. 3, 2002

(30) Foreign Application Priority Data

Sep. 26, 1997 (JP) .............................................. 9-261181
Mar. 6, 1998 (JP) ........................................... 10-054998

(51) Int. Cl.$^7$ ............................. G02B 6/12; G02B 6/36; H01L 29/00
(52) U.S. Cl. .............................. 385/14; 385/49; 385/88; 385/89; 385/92; 257/544; 257/550; 372/50
(58) Field of Search ............................. 385/14, 49, 50, 385/88, 89–94; 257/543, 544, 545, 549, 550; 372/45–50

(56) References Cited

U.S. PATENT DOCUMENTS 4,210,923 A * 7/1980 North et al. .................... 385/88
4,926,545 A * 5/1990 Pimpinella et al. ........... 385/14
4,974,041 A * 11/1990 Grinberg ..................... 257/347
5,900,763 A * 5/1999 Rahim et al. ................ 257/544

FOREIGN PATENT DOCUMENTS

JP  61-174790   * 8/1986
JP   9005548      1/1997

OTHER PUBLICATIONS

Yamada et al., "Filter–type WDM Transceiver Optical Circuit Using PLC Platform", Preprint of Proceedings for 1996 Spring Conference of Society of Electronic Communicaitons.

(List continued on next page.)

Primary Examiner—Hemang Sanghavi
(74) Attorney, Agent, or Firm—Ostrolenk, Faber, Gerb & Soffen, LLP

(57) ABSTRACT

In an optical module having a silicon substrate, a plurality of optical semiconductor devices and optical waveguides for performing transmission of optical signals by the semiconductor devices integrated on the silicon substrate, the silicon substrate is doped with an impurity to increase the number of carriers in the silicon substrate for suppressing optical crosstalk between the plurality of optical semiconductor devices, the optical waveguide is composed of a core part and a peripheral cladding layer of the core part, or optical fibers each coupled with each of the semiconductor devices, and an electrical resistivity of part or all of the silicon substrate is 0.1 Ωcm or less, or a lower part of an optical semiconductor light receiving device is made high in resistance, and a lower part of an optical semiconductor light emitting device is made low in resistance in which construction, each of the optical semiconductor devices is locally coated with a transparent resin, and all the parts protruding upward from the optical waveguide are coated with a light absorbent such as one or plural caps.

24 Claims, 26 Drawing Sheets

OTHER PUBLICATIONS

Yamada et al., "Application of Planar Lightwave Circuit Platform to Hybrid Integrated Optical WDM Transmitter/Receiver Module", Electronic Letters, vol. 31, No. 16 (Aug. 3, 1995).

Kanayama et al., "Characteristic of SC Type Fixed Attenuator using Metal Doped Fiber", 1994 Spring Conference of the Society of Electronic Information Communications, C–347, English and Japanese translation.

R.D. Soref et al., Electrooptical Effects in Silicon, IEEE J. Quantum Electron., vol. QE–23, No. 1 (1987).

* cited by examiner

*PIROR ART*

OPTICAL MODULE

This applications based on patent application Ser. No. 261,181/1997 filed Sep. 26, 1997 in Japan and No. 54,998/1998 filed Mar. 6, 1998 in Japan, the content of which is incorporated hereinto by reference.

BACKGROUND OF THE INVENTION

1. Field of the Invention

The present invention relates to an optical module comprising an optical waveguide and a plurality of semiconductor devices integrated on a substrate, more specifically to an optical module which is able to reduce optical noise caused by reflections of leakage lights (or stray lights) in various paths within such a module, thereby reducing crosstalk between semiconductor devices.

2. Description of the Prior Art

Recently, towards construction of an optical subscriber system, necessity for development of low-cost optical modules has been widely recognized. Especially, cost effectivity is important for WDM optical transmitter and receiver modules for multiplexing and demultiplexing 1.3 μm /1.55 μm optical signals and performing bidirectional transmission and reception at 1.3 μm.

With the aim of cost reduction of optical modules, as described in the document (I) below, development is conducted for a hybrid integrated type optical module in which a laser diode (hereinafter in some cases referred simply to as LD), a photodiode (hereinafter in some cases referred to as PD) and the like are disposed directly on a silica optical waveguide substrate. (I) Yamada et al., Preprint of Proceedings for 1996 Spring Conference of the Society of Electronic Communications FIGS. 27A and 27B are diagrams showing the structure of a prior art optical module, including a perspective view and a sectional diagram showing an important part of the structure of optical waveguide. The optical module shown in FIG. 27A is the one which is described in the above document (I) and has been developed by the inventors.

In the optical module shown in FIG. 27A, a silica optical waveguide 2 is formed on a silicon (hereinafter abbreviated to as Si) substrate 1 provided with irregularities as a substrate, which is referred to a platform. On a Si recess 1a of the platform, an embedded type silica optical waveguide 2 is formed in such a configuration that a core 2a is embedded with a cladding layer 2b of a sufficient thickness. Using the optical waveguide 2, a wavelength multiplexing/demultiplexing circuit (WDM circuit) 101 for multiplexing and demultiplexing 1.3 μm/1.55 μm and a Y-split circuit 102 for 1.3 μm light are formed.

As the wavelength multiplexing/demultiplexing circuit (WDM circuit) 101, a wave multiplexing/demultiplexing function is achieved by a wavelength selection filter 10 inserted in a groove formed in the optical waveguide. Further, on a Si protrusion 1b provided in the vicinity of the end portions of two input/output waveguides of the Y-split circuit 102, a recessed optical device mounting portion 15 is provided which is formed by recessing the optical waveguide substrate 2, and on the thus formed recessed optical device mounting portion 15, a semiconductor chip of LD 30, a semiconductor chip for monitoring PD 32 and a semiconductor chip of a receiver PD 31 are directly mounted.

With this construction, the number of parts constituting the optical module can be substantially reduced. In FIG. 27A, reference numeral 4 indicates an optical fiber connection part, whereas 4a and 4b are optical fibers.

In this optical module, as shown in FIG. 27B, an embedded type optical waveguide 2 is used in which the core 2a is embedded with the cladding layer 2b of a sufficient thickness. Therefore, of the output lights from the LD 30, the components which are not coupled to an optical transmission mode of the optical waveguide 2 are transmitted as leakage lights in the cladding layer 2b, which leak into the optical fiber 4b causing a noise of 1.55 μm port, so that a countermeasure thereto has been required. That is, it has been required to reduce crosstalk lights generated by leakage of 1.3 μm output lights from LD 30 into the optical fiber 4b of 1.55 μm output lights.

As a countermeasure thereto, it is effective to provide a light blocking area which is formed by removing an unnecessary part of the cladding layer 2b while remaining the vicinity of the core 2a (Terui et al., "Optical Waveguide Circuit"; Japanese Patent Application Laid-open No. No. 9-5548).

FIG. 28 is a plane diagram showing the structure of an example of an optical module provided with such a light blocking area, wherein the light blocking area 20 is formed by removing an unnecessary area of the cladding layer 2b (which may be referred to just as "cladding" or "cladding part") in front of the recessed optical device mounting portion 15, except the nearby area of the core 2a. With this construction, leakage lights from LD 30 can be prevented from reaching the optical fiber 4b for 1.55 μm output lights. Since the present invention is not directed to a wavelength multiplexing/demultiplexing circuit itself, detailed description thereof is omitted.

The optical module shown in FIG. 28 is provided with a semiconductor chip LD 30 and a semiconductor chip for receiver PD 31 on the same substrate, however, since in an ordinary operation method, the LD 30 and the receiver PD 31 will never be driven simultaneously, turning round of the lights from the LD 30 to the receiver PD 31 is not a problem.

However, when the LD 30 and the receiver PD 31 are to be driven simultaneously, an important problem occurs in the optical module using the embedded type optical waveguide 2. Specifically, because the LD 30 and the receiver PD 31 are disposed in the vicinity of each other on the substrate, the lights outputted from the LD 30 leak into the receiver PD 31, which becomes a noise to the received optical signal. In the ordinary method of use, the LD 30 itself outputs lights of an intensity of +10 to +20 dBm. On the other hand, the receiver PD 31 is required to receive a weak optical signal of less than −30 dBm. Therefore, when receiving such a weak optical signal, the presence of leakage light from the LD 30 has been a critical problem.

From the past, the light leakage path from the LD 30 to the receiver PD 31, as shown by the broken (First Path) line in FIG. 29, of forward and backward output lights from the LD 30, is considered to be mainly a radiation component which is not coupled to the optical transmission mode of the optical waveguide 2 and inputted directly to the receiver PD 31, and the leakage light component has been expected to be prevented, as shown in FIG. 28, by improving the relative positions of the LD 30 and the receiver PD 31 so that the receiver PD 31 is not positioned within the radiation angle of the output lights from the LD 30, thereby preventing the radiation component from the LD 30 from being applied directly to the receiver PD 31.

In addition to the above, the inventors have found that there exist second and third leakage light generation paths as shown by the dotted lines in FIG. 29.

A second leakage light generation position is reflection from a backside wall of the recessed optical device mounting portion 15. That is, some of the backward output lights from the LD 30 are reflected by a backside wall 150 of the recessed optical device mounting portion 15 and an optical waveguide substrate end portion 151, and are incident to the receiver PD 32.

A third leakage light generation path is caused by the light blocking area 20 itself. That is, the output lights from the LD 30 are reflected by a side wall 201 at a side closer to the LD 30 of the light blocking area 20, and incident thereafter to the receiver PD 31. This path can seemingly be prevented by filling the light blocking area 20 with a light absorber, however, in practice, even if it is filled with a light absorber, the third path is inevitably generated so far as there is a refractive index difference between the optical waveguide cladding layer 2b and the absorber.

As described above, the second and third leakage light generation paths are formed by reflection of leakage lights at a refractive index discontinuity portion, and the basic cause thereof is common.

Leakage lights due to the second and third paths become those transmitted to optical devices other than the light emitting devices to generate a noise and, at the same time, are incident again as the leakage lights to the light emitting device itself. As a result, there is a problem in that when the return lights are strong in intensity, it causes a return light noise of the light emitting device itself.

Yet further, in effect, apart from the above described leakage light paths, there is another path in which the leakage lights from these light emitting devices are reflected by a bottom surface or side wall of the optical waveguide substrate itself to enter the light receiving device.

FIGS. 30A and 30B schematically show the state. In this module, the core part 2a and the cladding part 2b of the optical waveguide are formed on a silica glass substrate 10, and the light emitting device 30 and the light receiving device 31 are provided to couple with the core part 2a. However, with such a simple construction, as shown by the arrows in FIG. 30B, stray lights easily reach the light receiving device 31. As a measure for such a problem, heretofore a method to block lights transmitting the above described cladding part, a method of using a wavelength selective filter or the like has been considered.

A construction example shown in FIGS. 31A and 31B is a simplified construction which is applied with a method to block lights transmitting the cladding part (e.g., above-described Japanese Patent Application Laid-open No. 9-5548 "Optical Waveguide Circuit"). In this example, as shown in FIG. 31A, a light blocking groove 20 is formed on the surface of the cladding part 2b so that the transmission of stray lights is suppressed by reflection or scattering by the side surface of the groove 20. In this case, the optical module is constructed to be provided with the light emitting device 30 and the light receiving device 31 so that it is connected to an external device by the same output port through the Y-split optical waveguide 2a.

In general, in such a module, stray lights from the light emitting device 30 not coupled with the optical waveguide 2 enters the light emitting device 31 resulting in the generation of a noise. Geometrical optical paths of stray lights are, for example, as shown by the arrows in FIG. 31B. A greater part of the stray lights are reflected or scattered on the side surface of the groove 20, and the amount of stray lights entering the light emitting device 31 is reduced. As to formation of such a groove, when a silica glass optical waveguide is used as an optical waveguide, since fine processing of silica glass by machining is generally difficult, formation of the groove is performed by a physicochemical method such as plasma etching or the like, different from machining. For this reason, it is very difficult to form a groove of large depth, and a shallow groove is formed on the surface of the substrate. Therefore, stray lights transmitting below the substrate are difficult to be blocked by this groove, and the stray lights of this part reach the light receiving device 31 while repeating reflections.

Furthermore, a construction example shown in FIGS. 32A to 32C is the one that is applied with a method of using a wavelength selective filter (e.g., Inoue et al., Japanese Patent Application No. 9-151825 "Bidirectional WDM Optical Transmission and Reception Module"). In this example, the optical module is constructed such that receive light and transmit light have wavelengths $\lambda$in and $\lambda$out differing from each other, these both light waves are respectively transmitted or reflected by the wavelength selective filter 10 and connected through the same port to an external device (FIGS. 32A, 32B). Since the wavelength selective filter 10 has a wavelength selectivity, it can also reflect stray lights from the light emitting device 30 as shown by an arrow in the sectional diagram FIG. 32C.

However, in this method, the wavelength selective filter 10 is inserted in a very narrow groove 12, and, for an insertion of the filter deep into the substrate, it is required to form a groove of a very high aspect ratio, which involves a technical difficulty. Therefore, since a groove is formed with an appropriate depth, this method is not effective to the stray lights transmitting below the substrate as with the above-described example. Moreover, this method cannot be applied to an optical module using the same wavelength.

Still further, it has been found through studies conducted thereafter, noises are generated due to further leakage light paths apart from the reflection by the light blocking groove formed by removing the optical waveguide cladding or at recesses for optical device mounting or the like, and from the stray lights transmitting below the substrate.

For example, in the module of the structure of FIGS. 32A to 32C, another path has been found where a strong scattering of light is generated at the part of the wavelength selective filter 10, and, after repeating multiple scattering, lights reach the light receiving device 31 through a space above the substrate. This path is generated when a structure largely protruding from the substrate is formed as shown in the figures, and had not been recognized as a problem in the past.

That is, in the above structure, considering the fact that optical devices generally having a thickness of about 100 to 200 $\mu$m protrude greater than the cladding of optical waveguide generally having a thickness of several tens of $\mu$m, leakage lights transmitting through a space over the optical waveguide is investigated, and, as a result, it has been found that the leakage lights have a large influence on the generation of crosstalks.

A first object of the present invention, in order to solve the above-described prior art technical problems in an optical module in which an optical waveguide and optical semiconductor devices are integrated on a substrate, is to provide a technology as a first aspect thereof, which can prevent reflection of the basically horizontal movement of the stray lights from a light emitting device at a refractive index discontinuity part, which reflection is incident thereafter to semiconductor devices.

A second object of the present invention, in order to solve problems with such a prior art optical module, as a second aspect thereof, is to provide a construction for effectively suppressing optical noises due to the lights leaking below the substrate and reflected by the bottom surface or side wall, resulting in a degradation of signals.

A further object of the present invention, in order to solve the problems of leakage lights scattered on the substrate or in the vicinity of the filter and transmitting a space above the substrate, as a third aspect thereof, is to provide a structure of optical module which can efficiently suppress the leakage lights to reduce crosstalk.

SUMMARY OF THE INVENTION

An optical module according to the present invention has a silicon substrate, a plurality of optical semiconductor devices integrated on the silicon substrate, and an optical waveguide for performing transmission of optical signals by the optical semiconductor devices, wherein the silicon substrate contains an impurity (dopant) for increasing the number of carriers in the silicon substrate thereby suppressing optical crosstalk between the plurality of optical semiconductor devices.

Further, in particular, to achieve the first object, the optical waveguide comprises a core part for coupling the semiconductor devices with each other on the substrate and a peripheral cladding layer of the core part, or in a construction where each optical fiber is coupled to each semiconductor device, an electrical resistivity of some part or all of the silicon substrate is 0.1 Ωcm or less, or a lower part of a light receiving device of the optical semiconductor is made high in resistance and a lower part of a light emitting device of the optical semiconductor is made low in resistance.

To achieve the second object of the present invention, the optical waveguide is an embedded type optical waveguide in which the core part is embedded with the cladding layer, a backside wall of a recess formed in the cladding layer is formed not to be perpendicular to the optical axis of the semiconductor device, and the cladding layer other than the vicinity of the core part is removed to form a further light blocking area in front or rear of the recess in such a manner that the optical waveguide is not divided, wherein the light blocking area formed at the rear of the recess is filled with a black light blocking substance, and the side wall thereof is set obliquely.

Still further, a plurality of recesses are provided, of which between at least those disposed side by side in a longitudinal direction of the optical waveguide, a light blocking area is also formed by removing the cladding layer other than the vicinity of the core of the optical waveguide in such a manner that the optical guide is not divided, the rear side wall is set not to be perpendicular to the optical axis of the semiconductor optical device, or the side wall of the light blocking area is formed not to cross at right angles with the optical axis of the semiconductor optical device.

To attain the third object of the present invention, the optical module has a further filter inserted in a groove formed in the optical waveguide, each of the optical semiconductor devices is locally covered with a transparent resin, the parts protruding upward from the optical waveguide are all coated with a light absorber, and, in this case, either each of them is covered with separate caps or all of them are covered with a single cap.

According to the first aspect of the present invention, in an optical module, all of the leakage light generation paths including generation of leakage lights in the horizontal direction from the light emitting device caused by the presence of a refractive index discontinuity in the optical waveguide can be eliminated, thereby reducing crosstalk optical noises generated due to the leakage lights.

Further, according to the same aspect of the present invention, leakage lights from the light emitting device incident to other optical devices on the same optical waveguide substrate and generate noises can be prevented, and generation of return light noises in the light emitting device can also be prevented.

Still further, according to the second aspect of the present invention, in an optical module in which an optical waveguide and optical semiconductor devices are integrated on a substrate, optical noises due to leakage lights below the substrate degrading the signals can be efficiently suppressed to obtain a high light reception sensitivity, thereby providing an optical module construction of improved functions.

Yet further, according to the third aspect of the present invention, stray lights transmitting above the optical integrated substrate, which have not been taken into consideration in the past, can be efficiently suppressed, thereby enabling an optical module with minimized optical crosstalks. In particular, it is apparent that when the light emitting device and the light receiving device are included in the optical module, the present invention provides an optical module construction which is very effective in achieving an optical module with superior reception characteristics.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

Figure 1A:
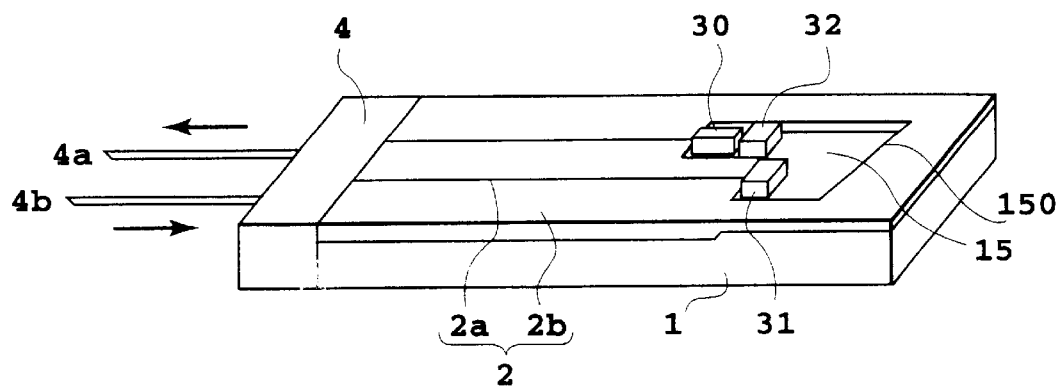
FIGS. 1A and 1B are schematic diagrams showing the structure of the optical module according to an embodiment 1 of the present invention.

In the following, embodiments according to the first aspect of the present invention will be described in detail with reference to the drawings.

In all of the drawings for describing the embodiments, those having similar functions have similar reference numerals, and detailed description thereof is omitted.

Embodiment 1

Figure 1B:
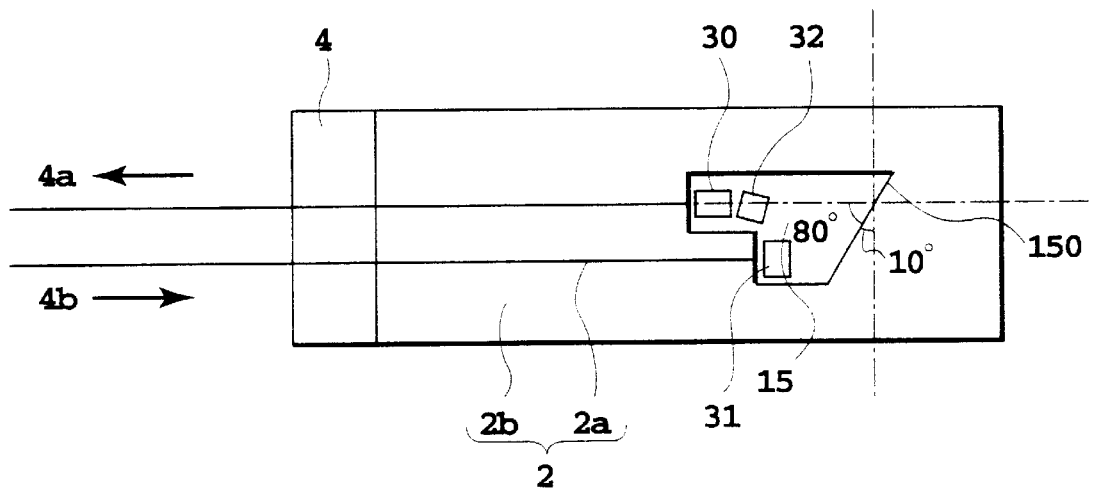

FIGS. 1A and 1B are diagrams showing the construction of the optical module according to an embodiment 1 of the present invention, in which FIG. 1A is a perspective view and FIG. 1B is a plane view.

The optical module of the present embodiment is composed of an embedded type silica optical waveguide 2 comprising a cladding layer 2b and a core 2a formed on a silicon (Si) substrate 1, a semiconductor chip of LD 30 disposed on the Si substrate 1, a semiconductor chip of a monitor-receiver PD (which may be referred to simply as monitor PD) 32 and a semiconductor chip of a receiver PD 31. The optical waveguide 2 is formed of two straight waveguides, and connected to ends of which are two optical fibers (4a, 4b) with an optical fiber connection part 4.

Here, the optical waveguide 2 is an embedded type optical waveguide 2 in which the core 2a is embedded with the cladding layer 2b having a sufficient thickness, and the "cladding layer of a sufficient thickness" means that the cladding layer is set thicker than a depth for the lights transmitting through the core 2a to come out to the cladding layer 2b, which normally requires a thickness equal to or greater than the core size.

The three semiconductor devices (30, 31 and 32) are all disposed on a recessed optical device mounting portion 15 formed by removing the optical waveguide 2 (core 2a and cladding layer 2b) into a recessed form. To prevent output lights from the LD 30 from leaking directly to the receiver PD 31, the receiver PD 31 is disposed in such a manner that it is not positioned within the radiation angle of the backward output lights from the LD 30.

A characteristic feature of the present embodiment is that the rear side wall 150 of the recessed optical device mounting portion 15 is disposed obliquely. In the present embodiment, the rear side wall has an angle of about 80 degrees with respect to a perpendicular line of the optical axis of the backward output light from the LD 30 (about 10 degrees to a perpendicular line of the optical axis of backward output light from the LD 30). As a result, the backward output light from the LD 30, after being reflected by the rear side wall 150 of the recessed optical device mounting portion 15, can be prevented from leaking into the receiver PD 31. In the optical module of the present embodiment, crosstalk light from the LD 30 to the receiver PD 31 was about −30 dB.

Figure 2:
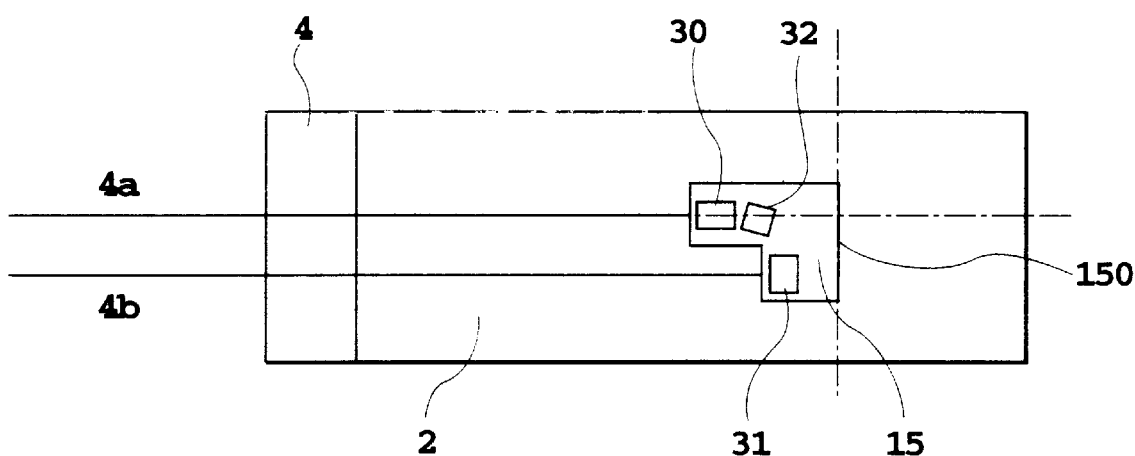
FIG. 2 is a plane diagram showing the construction of an optical module fabricated according to a prior art for comparing with the optical module of embodiment 1 of the present invention.

For comparison, an optical module according to the prior art as shown in FIG. 2 was fabricated and the crosstalk light therein was measured. In this comparative example, the LD 30 and the receiver PD 31 are disposed on the same recessed optical device mounting portion 15, and the rear side wall 150 of the recessed optical device mounting portion 15 is almost perpendicular to the optical axis. In the module according to the prior art, since some of the backward output lights from the LD 30 leak into the receiver PD 31 due to the reflection from the rear side wall 150 of the recessed optical device mounting portion 15, crosstalk light from the LD 30 to the receiver PD 31 was about −25 to −27 dB. From the above comparison, the effect of the optical circuit construction of the present embodiment is apparent.

Figure 3A:
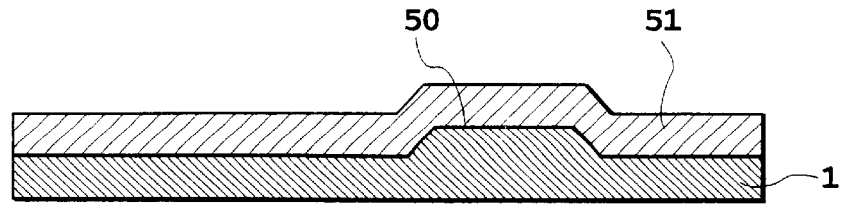
FIGS. 3A to 3E are diagrams showing an example of fabrication method of the optical module of embodiment 1 of the present invention.
Figure 3B:
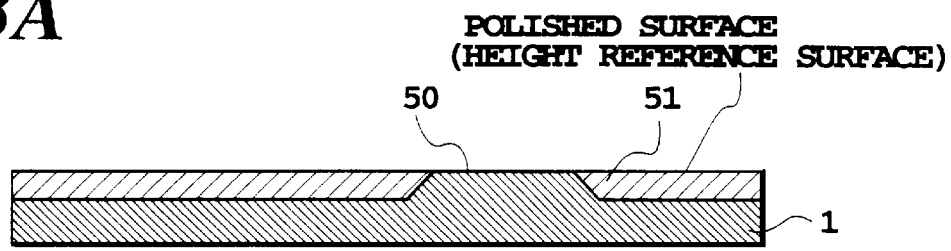

Next, an example of fabrication method of the optical module of the present embodiment will be briefly described with reference to FIGS. 3A to 3E. First, the flat Si substrate 1 is patterned to etch an area other than a Si terrace (protruded portion) 50 to a depth of about 30 μm where the semiconductor chip of LD 30, the semiconductor chip of monitor receiver PD 32 and the semiconductor chip of receiver PD 31 are to be mounted. On the etched portion, a glass layer to be a lower cladding layer 51 is formed by a flame deposition method (FIG. 3A). After that, flat polishing is performed until the surface of the Si terrace 50 is exposed (FIG. 3B). This surface becomes a level reference surface for the optical waveguide when the semiconductor chip of LD 30, the semiconductor chip of monitor PD 32 and the semiconductor chip of receiver PD 31 are packaged.

Figure 3C:
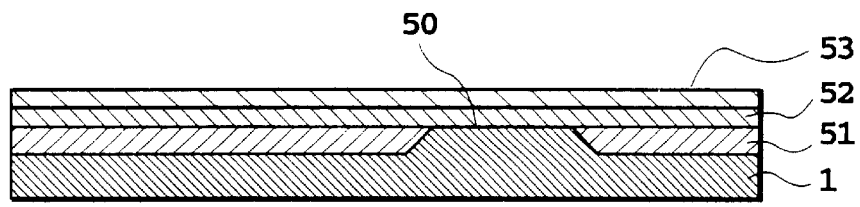
Figure 3D:
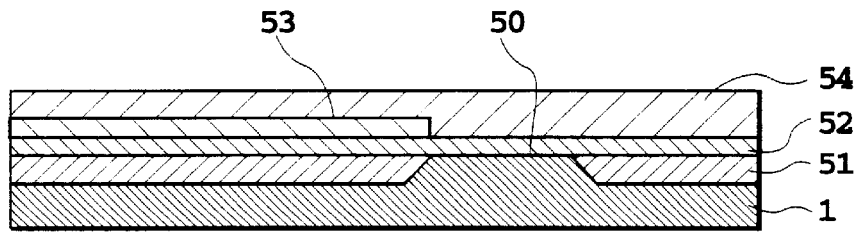
Figure 3E:
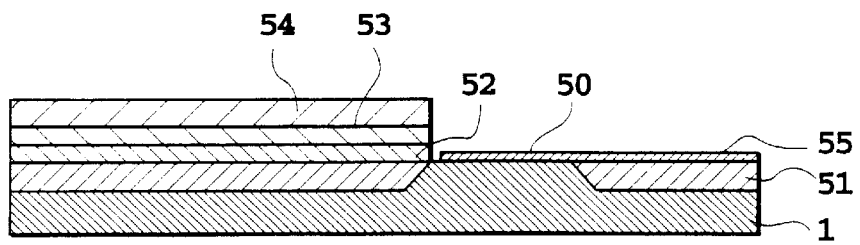

Subsequently, a height adjusting cladding layer (second lower cladding layer) 52 to be a height adjusting layer is formed. Next, a core layer 53 is deposited to a thickness of about 7 μm (FIG. 3C). After the core layer is etched into an optical waveguide pattern, an upper cladding layer 54 is deposited (FIG. 3D). Here, deposition of all of the cladding layers and the core layer is achieved by using the flame deposition method. Thereafter, only the Si terrace 50 is etched until the Si terrace is again exposed. Finally, electrode wirings for the LD 30, the monitor receiver PD 32 and the receiver PD 31 are deposited, together with a mounting solder 55 (FIG. 3E).

Embodiment 2

Figure 4:
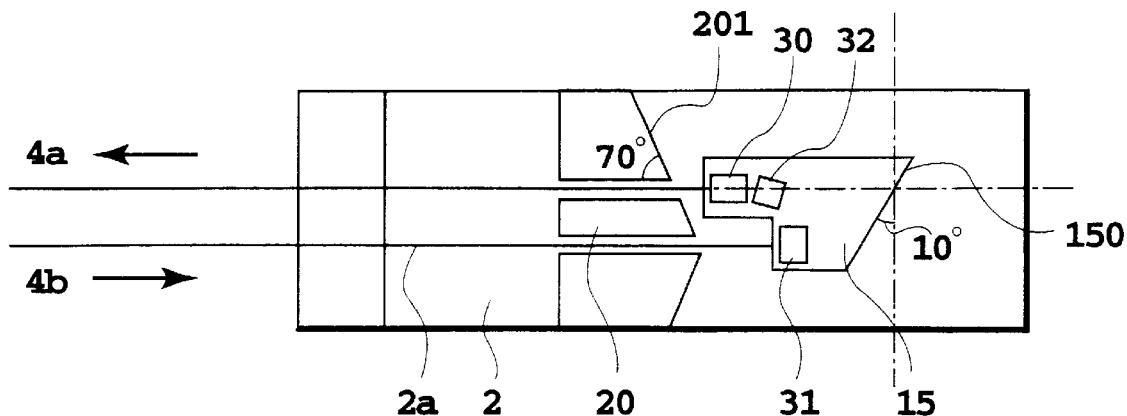
FIG. 4 is a plane diagram showing the structure of the optical module according to an embodiment 2 of the present invention.

FIG. 4 is a plane view showing a construction of the optical module according to an embodiment 2 of the present invention. In the present embodiment, the structure in the vicinity of the recessed optical device mounting portion 15 is same as embodiment 1. However, the module of the present embodiment differs from the embodiment 1 in that a light blocking area 20 is provided in front of the recessed optical device mounting portion 15.

The light blocking area 20 is provided to prevent forward output lights from the LD 30 from leaking into the optical fiber 4b. A characteristic feature of the present embodiment resides in that a side wall 201 at the LD 30 side of the light blocking area 20 is slanted by an angle of about 70 degrees relative to the optical axis of the forward output lights of the LD 30. As a result, the path of leakage lights caused by the forward output lights from the LD 30 reflected by the side wall 201 of the light blocking area 20 and leaking into the receiver PD 31 could be cut out. In the thus fabricated optical module of the present embodiment, crosstalk light from the LD 30 to the receiver PD 31 was less than −30 dB.

Figure 5:
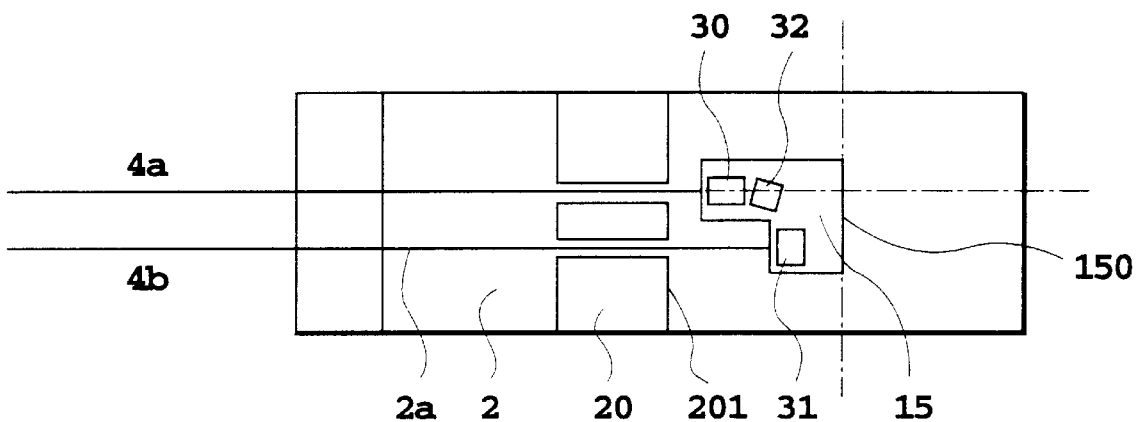
FIG. 5 is a plane diagram showing the construction of an optical module fabricated according to a prior art for comparing with the optical module of embodiment 2 of the present invention.

For comparison, an optical module according to the prior art as shown in FIG. 5 was fabricated and measured for crosstalk light. In this comparative example, the rear side wall 150 of the recessed optical device mounting portion 15 and the side wall 201 of the light blocking area 20 are both disposed almost perpendicular to the optical axis of the LD 30. As a result, in the module according to the prior art, crosstalk light from the LD 30 to the receiver PD 31 is decreased to about −20 to −24 dB, thus an effect of crosstalk light degradation due to the reflected lights is apparent. From the above comparison, the effect of the optical circuit construction of the present embodiment is apparent.

Embodiment 3

Figure 6:
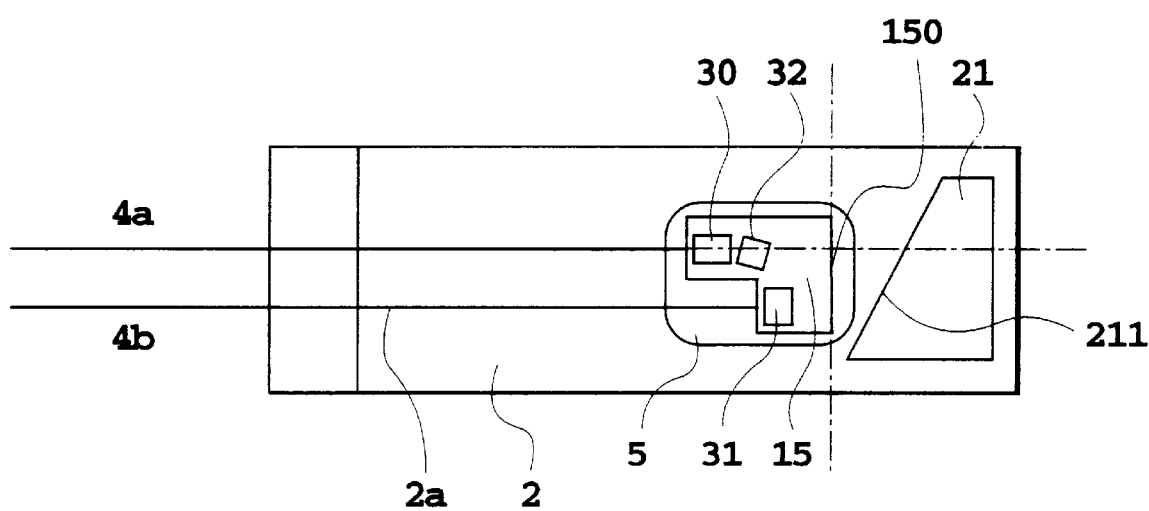
FIG. 6 is a plane diagram showing the structure of the optical module according to an embodiment 3 of the present invention.

FIG. 6 is a plane diagram showing the construction of an optical module according to an embodiment 3 of the present invention. The basic structure of the present embodiment is same as the above embodiment 1. However, the optical module of the present embodiment differs from the above embodiment 1 in the points that (1) the recessed optical device mounting portion 15 is filled with a transparent resin 5 for potting sealing, (2) the rear side wall 150 of the recessed optical device mounting portion 15 is set nearly perpendicular to the optical axis of rear output light from the LD 30, (3) further, as a most characteristic structure, a light blocking area 21 is provided at the rear side of the recessed optical device mounting portion 15 which is filled with a black light absorbent substance, and its side wall 211 is set obliquely.

In the present embodiment, the reason why the rear side wall 150 of the recessed optical device mounting portion 15 is not disposed obliquely is that since the recessed optical device mounting portion 15 is filled with the transparent resin 5, reflection due to refractive index discontinuity at the side wall becomes negligibly small. However, in this case, reflection at an end of the optical waveguide is a problem, and the reflection therefrom generates a leakage light path. To prevent this, the light blocking area 21 is disposed at the rear of the recessed optical device mounting portion 15. As a result, as the crosstalk light from the LD 30 to the receiver PD 31, a value of about −30 to −33 dB was obtained.

Embodiment 4

Figure 7A:
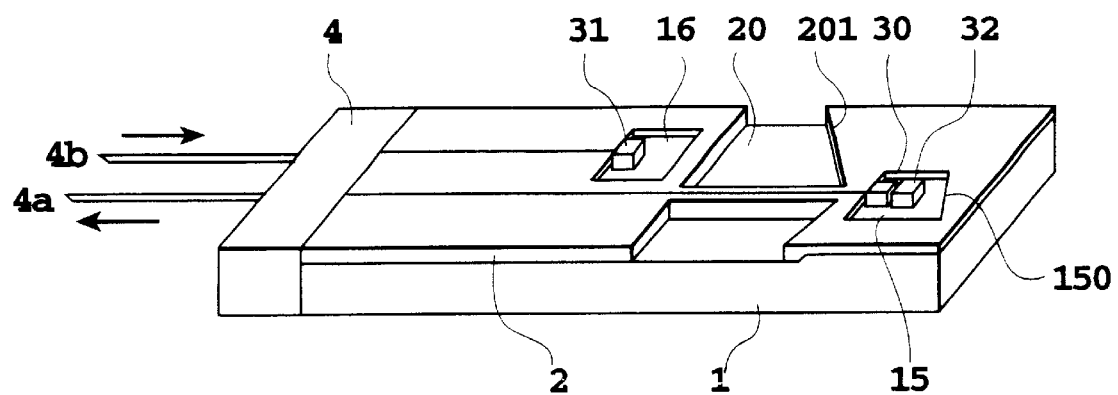
FIGS. 7A and 7B are diagrams showing the construction of the optical module of an embodiment 4 of the present invention.
Figure 7B:
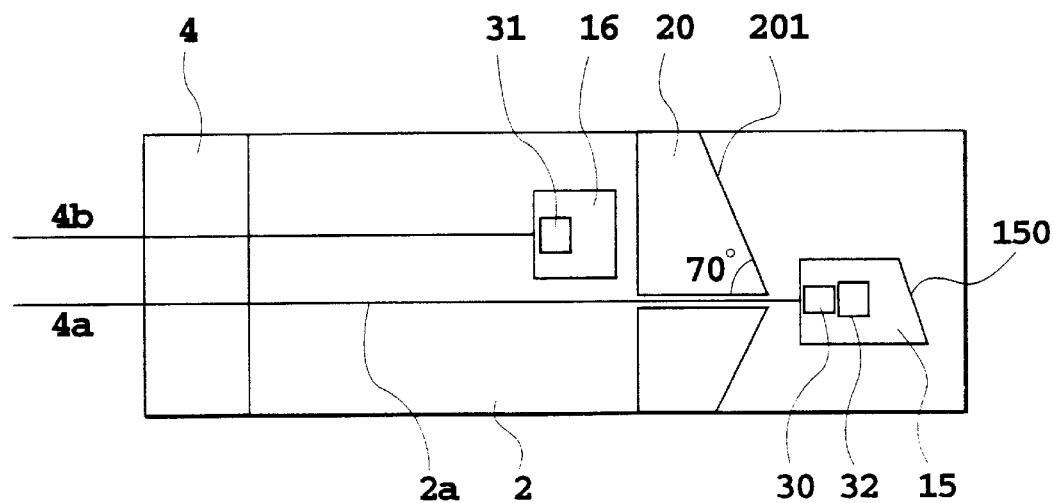

FIGS. 7A and 7B are diagrams showing the construction of an optical module according to an embodiment 4 of the present invention, in which FIG. 7A is a perspective diagram and FIG. 7B is a plane diagram. The optical module of the present embodiment comprises an embedded type silica optical waveguide 2 including a cladding layer 2b and a core 2a formed on a Si substrate 1, and a semiconductor chip of LD 30, a semiconductor chip of monitor receiver PD 32 and a semiconductor chip of receiver PD 31, which are disposed on the Si substrate 1.

The optical waveguide 2 is formed of two straight waveguides, an end of which is connected with optical fibers 4a and 4b. The LD 30 and monitor receiver PD 32 are disposed on the recessed optical device mounting portion 15 formed by recessing the optical waveguide 2 (cladding layer 2b), and the receiver PD 31 is disposed on a recessed optical mounting portion 16 formed by recessing the optical waveguide 2 (cladding layer 2b). Further, a light blocking area 20 formed by removing the cladding layer 2b other than the vicinity of the core 2a is provided between the recessed optical device mounting portion 15 and the recessed optical device mounting portion 16.

The light blocking area 20 may be filled with an absorbent material in the inside, or an opaque metal film or the like may be formed on the side wall of the light blocking area 20. In the present embodiment, a gold thin film was formed on the light blocking area 20 side wall.

A characteristic of the present embodiment is that the LD 30 and the receiver PD 31 are disposed respectively on the different recessed optical device mounting portions (15, 16), the light blocking area 20 is provided in between, and of the side walls, the side wall 201 closer to the output end of the LD 30 is disposed obliquely to have an angle of 70 degrees with respect to the optical axis of the forward output lights of the LD 30. In addition, the rear side wall 150 of the recessed optical device mounting portion 15 for mounting the LD 30 is disposed obliquely.

As a result, of the forward output lights from the LD 30, the component which is not coupled with the optical waveguide 2 is reflected by the side wall 201 of the light blocking area 20. In this case, since the side wall 201 has an angle of 70 degrees with respect to the optical axis of the forward output lights of the LD 30, the light path is greatly changed after reflection, as a result, it can be prevented that the reflected light is coupled again with the LD 30 and the monitor receiver PD 32. Since the rear side wall 150 of the recessed optical device mounting portion 15 is slanted, rearward output lights from the LD 30 can be prevented from leaking into the LD 30 and the monitor PD 32. Further, optical signals leaking from the LD 30 to the receiver PD 31 and the optical fiber 4b at the receiver PD 31 side can be prevented by the light blocking area 20.

In effect, in the optical module of the present embodiment, crosstalk light from the LD 30 to the receiver PD 31 was about −35 dB. Further, crosstalk light from the LD 30 to the receiving optical fiber 4b was −50 dB.

As in the present embodiment, in an optical transmitter and receiver module having the LD 30 and the receiver PD 31, when the receiver PD 31 is disposed at the front and the LD 30 at the rear, and a light blocking area having a slanted surface is disposed in between, two effects of leakage light suppression between devices and leakage light suppression to optical fibers can be provided by a single light blocking area.

Embodiment 5

Figure 8:
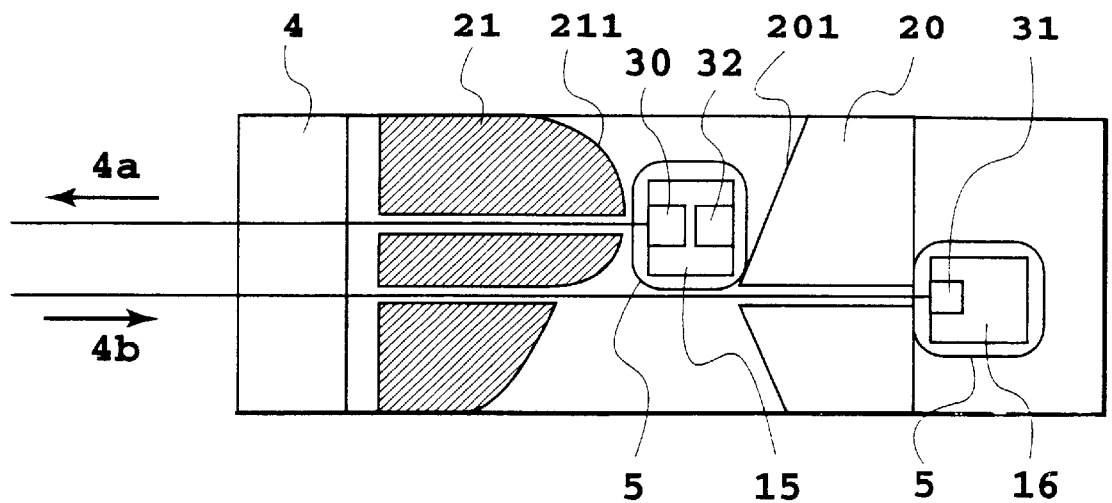
FIG. 8 is a plane diagram showing the structure of the optical module according to an embodiment 5 of the present invention.

FIG. 8 is a plane diagram showing the construction of an optical module according to an embodiment 5 of the present invention. In the present embodiment, as in the above embodiment 4, the LD 30 and the receiver PD 31 are disposed on different recessed optical device mounting portions (15, 16). However, the present embodiment differs from the above embodiment 4 in that the LD 30 is disposed in front (that is, the optical fiber connection part 4 side) of the receiver PD 31, and the recessed optical device mounting portions (15, 16) are filled with a transparent resin for potting sealing.

With such a construction, there is a danger that, of the forward output lights from the LD 30, the component which is not coupled with the optical waveguide 2 leaks into the optical fiber 4b, and the rearward output lights from the LD 30 into the receiver PD 31. Then, to prevent these leakage lights from leaking into the receiving optical fiber (2b) and the receiver PD 31, a light blocking area 21 and a light blocking area 20 are provided respectively in the front and rear of the recessed optical device mounting portion 15 on which the LD 30 is mounted.

Further, the side wall 211 and side wall 201 closer to the LD 30 of these light blocking areas (20, 21) are set to be a curved surface and a slanted surface, respectively. Still further, in the present embodiment, the inside of the light blocking areas (20, 21) is filled with a black filler for absorbing leakage lights.

Since, in the present embodiment, the side walls (201, 211) of the light blocking areas (20, 21) are formed to be a curved surface and a slanted surface, forward and rearward output lights of the LD 30 can be prevented, after being reflected by the side walls (201, 211) of the light blocking areas (20, 21), from coupling as return light again with the LD 30, or from leaking into the optical fiber 4b and the receiver PD 31.

Since, in the present embodiment, such a countermeasure for leakage light was taken, crosstalk light from the LD 30 to the receiver PD 32 could be reduced to less than −35 dB.

Embodiment 6

Figure 9:
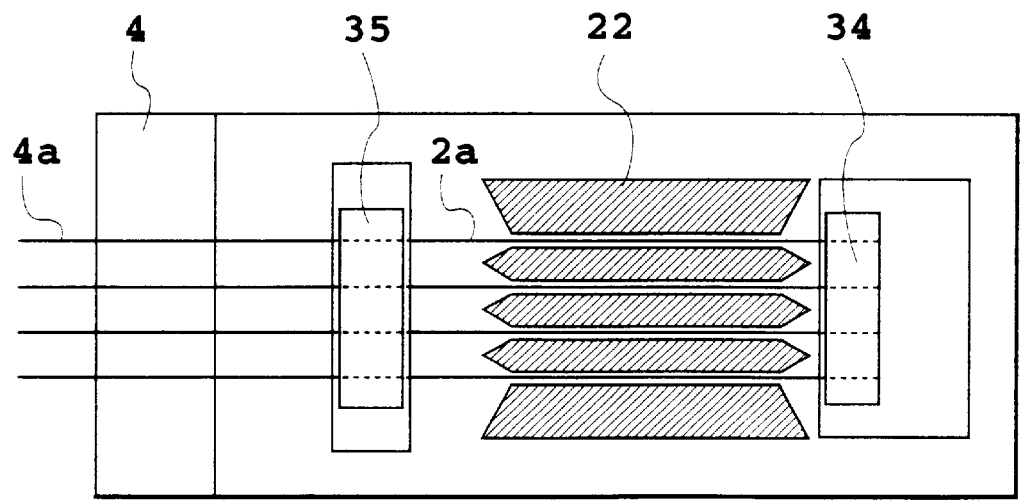
FIG. 9 is a plane diagram showing the structure of the optical module according to an embodiment 6 of the present invention.

FIG. 9 is a plane diagram showing the construction of an optical module according to an embodiment 6 of the present invention. In the Figure, reference numeral 34 indicates a 4-channel LD array, and 35 is an optical modulator array. These semiconductor optical devices and the optical fibers 4a are respectively connected by an embedded type optical waveguide 2.

In the optical module as shown in the present embodiment, when leakage lights from LDs of the LD array 34 are incident into an area other than the core of the optical modulator array 35, it becomes unmodulated lights leaking into the optical fiber 4a, causing a noise. That is, the lights incident as propagation mode to the optical modulator array 35 are modulated by the optical modulator array 35, however, light components incident as radiation mode are remained unmodulated, and one part thereof leaks into the optical fiber 4a. These leakage lights decrease an extinction ratio of modulated signal of the optical module, that is, a difference in optical intensity between when the optical modulator array 35 is on and when it is off.

To prevent the reduction in extinction ratio due to leakage lights, in the present embodiment, a light blocking area 22 is provided between the LD array 34 and the optical modulator array 35, and its side wall is formed to be a slanted surface. With such a structure, of the forward output lights from the LD of the LD array 34, a light component which is not coupled with the optical waveguide 2 can be prevented from reaching the optical modulator array 35. In addition, leakage lights reflected by the side wall of the light blocking area 22 can be prevented from recoupling again with LDs of the LD array 34.

Embodiment 7

Figure 10:
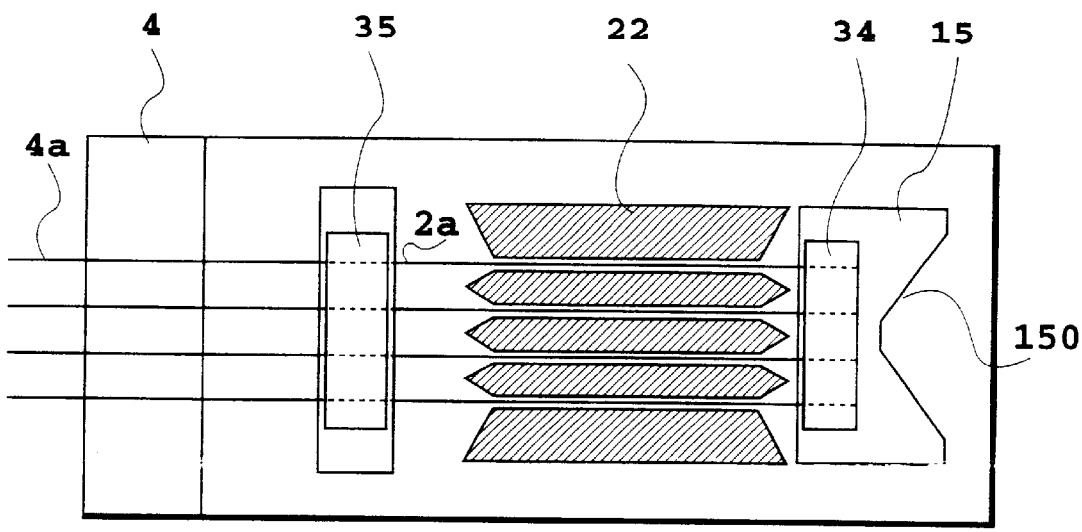
FIG. 10 is a plane diagram showing the structure of the optical module according to an embodiment 7 of the present invention.

FIG. 10 is a plane diagram showing the construction of an optical module according to an embodiment 7 of the present invention. The basic structure of the optical module of the present embodiment is almost the same as the above embodiment 6. However, the present embodiment differs from the above embodiment 6 in that the rear side wall 150 of the recessed optical device mounting portion 15 for mounting the LD array 34 is disposed obliquely. With this structure, since the return lights can be suppressed from the rear side wall 150 of the recessed optical device mounting portion 15 to the LDs themselves of the LD array 34, a very stable operation of the LD array 34 is possible.

Embodiment 8

Figure 11:
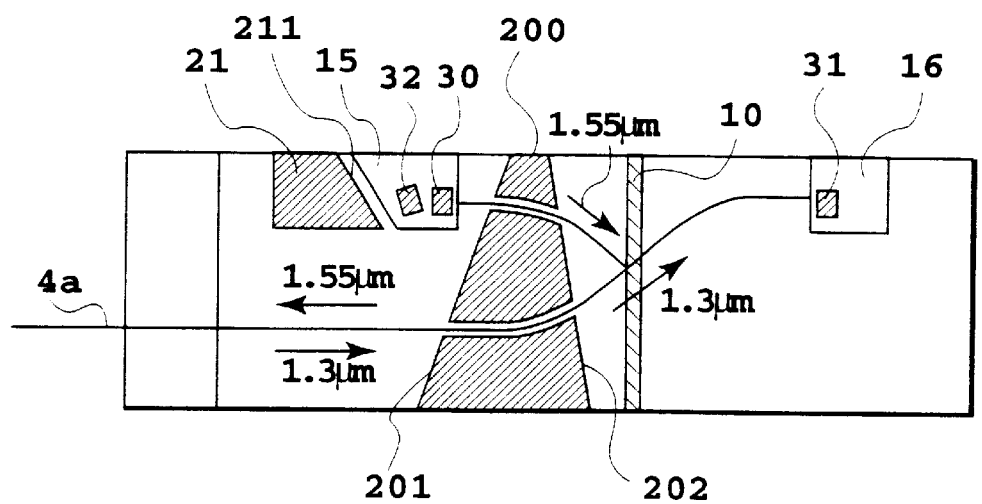
FIG. 11 is a plane diagram showing the structure of the optical module according to an embodiment 8 of the present invention.

FIG. 11 is a plane diagram showing the construction of an optical module according to an embodiment 8 of the present invention. The optical module of the present embodiment is composed of a 1.3 $\mu$m/1.55 $\mu$m wave multiplexing/demultiplexing circuit comprising a silica optical waveguide 2 and an interference film filter 10, a 1.55 $\mu$m LD 30 semiconductor chip and its monitor PD 32 semiconductor chip disposed on the recessed optical device mounting portion 15, and a 1.3 $\mu$m receiver PD 31 semiconductor chip disposed on the recessed optical device mounting portion 16.

To prevent forward output lights from the LD 30 from leaking into the receiver PD 31, a light blocking area 200 is provided, and to prevent reflection at an interface of the light blocking area 200, a side wall 201 of the light blocking area 200 is disposed obliquely. Further, a rear side wall 202 of a light blocking area 200 is also slanted so that unnecessary reflected light at the interference film filter 10 does not return to the LD 30.

Still further, to prevent rearward output lights from LD 30 from returning to the LD 30 itself, the rear side surface of the recessed optical device mounting portion 15 is slanted, and to prevent one part thereof from leaking into the optical fiber 4a, a light blocking area 21 is provided at the rear of the recessed optical device mounting portion 15, and its side wall 211 is also slanted to prevent reflection at an interface.

As described above, in the present embodiment, to prevent a crosstalk due to reflection in the optical module, light blocking areas (21, 200) and the recessed optical device mounting portion 15 having slanted side surfaces were used, thereby achieving crosstalk light of less than −45 dB from the LD 30 to the receiver PD 31.

The present invention has been described in detail with respect to various embodiments, and it will be apparent that changes and modifications may be made without departing from the invention in its broader aspects, and the scope of the present invention is not limited to the embodiments described.

Next, embodiments of an optical module according to the second aspect of the present invention will now be described.

Embodiment 9

Figure 12A:
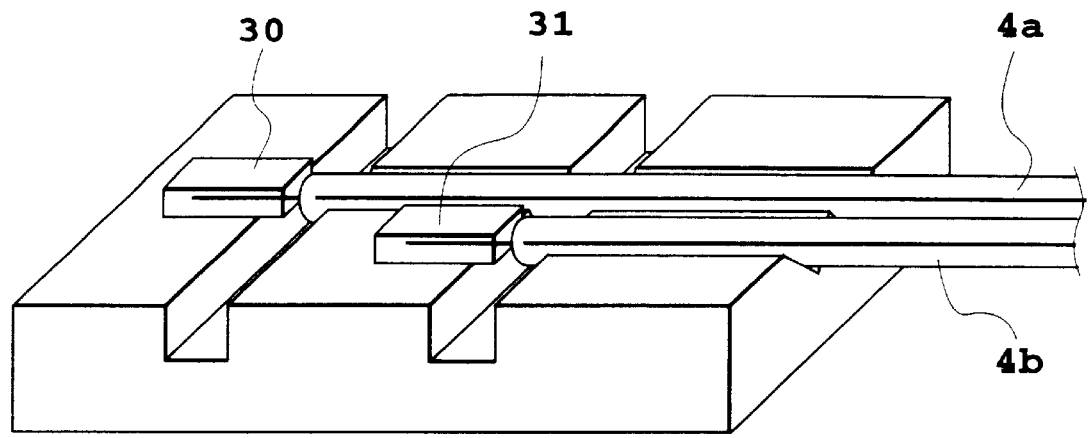
FIGS. 12A and 12B are diagrams showing the construction of the optical module of an embodiment 9 of the present invention.
Figure 12B:
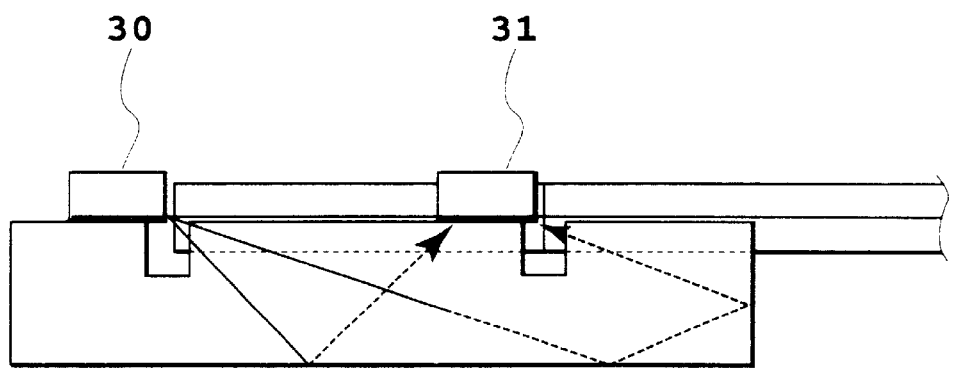

The structure shown in FIGS. 12A and 12B shows an optical module in which a laser diode 30 as a light emitting device and a photodiode 31 as a light receiving device are disposed on a silicon substrate formed with V-grooves, and optical fibers 4a and 4b are connected to these devices.

In this structure, of the lights originally output from the laser diode 30, the components, which are not optically coupled with the optical fiber as an optical waveguide, pass in the silicon substrate as indicated by the arrows in FIG. 12B and reach the photodiode 31 to degrade reception characteristic of the module. However, in the present embodiment, a low-resistance substrate is used as the silicon substrate. Since the substrate size is 1 cm square, the resistance value, aiming at about 10 dB/cm, was set to about 0.005 Ωcm. This improved suppression of an undesirable optical crosstalk in the optical module by about 10 dB.

Next, embodiments of the optical module according to the present aspect of the present invention will be described with reference to the drawings.

Embodiment 10

Figure 13A:
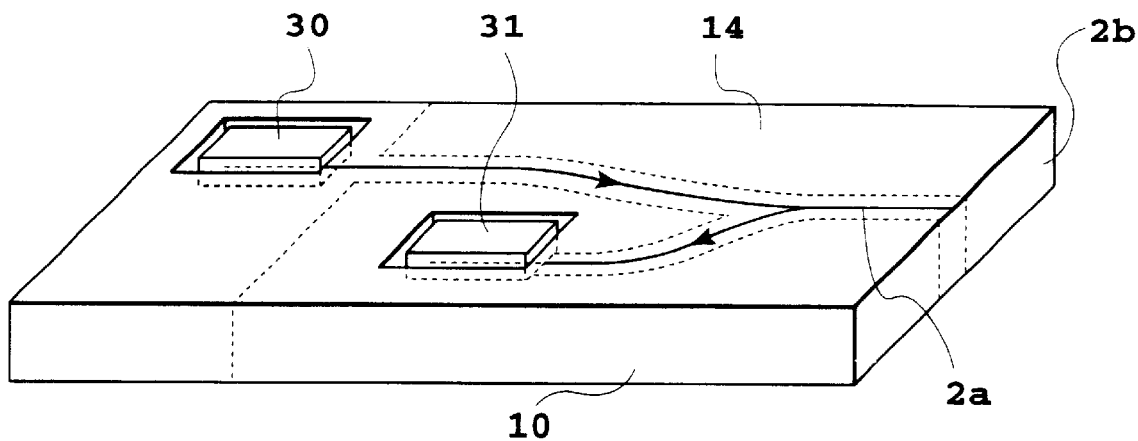
FIGS. 13A and 13B are diagrams showing the construction of the optical module of an embodiment 10 of the present invention.
Figure 13B:
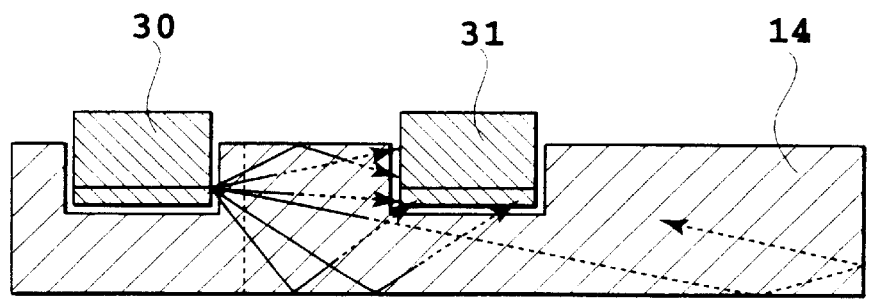

FIGS. 13A and 13B are diagrams for explaining an embodiment 10 of the optical module in which an optical waveguide core part 2a is formed on a silica glass substrate 10 to dispose a light emitting device 30 and a light receiving device 31. The optical waveguide comprises a core part 2a and a cladding part 2b differing in refractive index, and the light emitting device 30 and the light receiving device 31 are disposed on respective recesses formed in the cladding part 2b so that they are coupled with the core part 2a. In the present embodiment, an area 14 containing a large amount of metal is formed in a part other than the vicinity of the core part 2a of the optical waveguide.

By the metal containing area 14, stray lights leaking from the light emitting device 30 to the parts other than the core part 2a are absorbed or scattered before reaching the light receiving device 31 as shown in FIG. 13B. Here, the vicinity of the core part 2a generally indicates about twice as long as a mode field diameter which is an area confining lights of the optical waveguide, in this case means a part of about four times as wide as the optical waveguide width. As the metal to be added, Co or the like is effective (Kanayama et al., "Characteristics of SC Type Fixed Attenuator using Metal Doped Fiber", 1994 Spring Conference of the Society of Electronic Information Communications, C-347 In Japanese). The attenuation is preferably about 3 dB/cm.

Although metal doping to the rear part of the light emitting device 30 is not shown in FIG. 13A, when rear radiation is a problem, a metal-added area is provided also at the rear. Further, a contour of the metal-added area 14 is expressly shown in FIG. 13A for better understanding, however, in practice, it is convenient to pattern a metal film and use thermal diffusion, and, by this method the boundary of the metal-added area 14 becomes unclear. Still further, it is not always uniform also in the height direction. However, it is necessary to arrange and that the diffused metal does not reach the core part 2a of the optical waveguide and its periphery.

Since the distance between the light emitting device 30 and the light receiving device 31 in the module of the present embodiment is about 2 cm, and since attenuation is 3 dB/cm, with the above construction, the noise which is conside red to be indicated due to stray lights could be reduced by about 5 dB. As shown, by absorbing or scattering stray lights at a part where it is not necessary to transmit lights, optical noise could be reduced. In the present embodiment, a silica glass substrate is used, however, alternatively, for example, a semiconductor substrate such as Si substrate or a ceramic substrate such as alumina may be used.

Embodiment 11

Figure 14A:
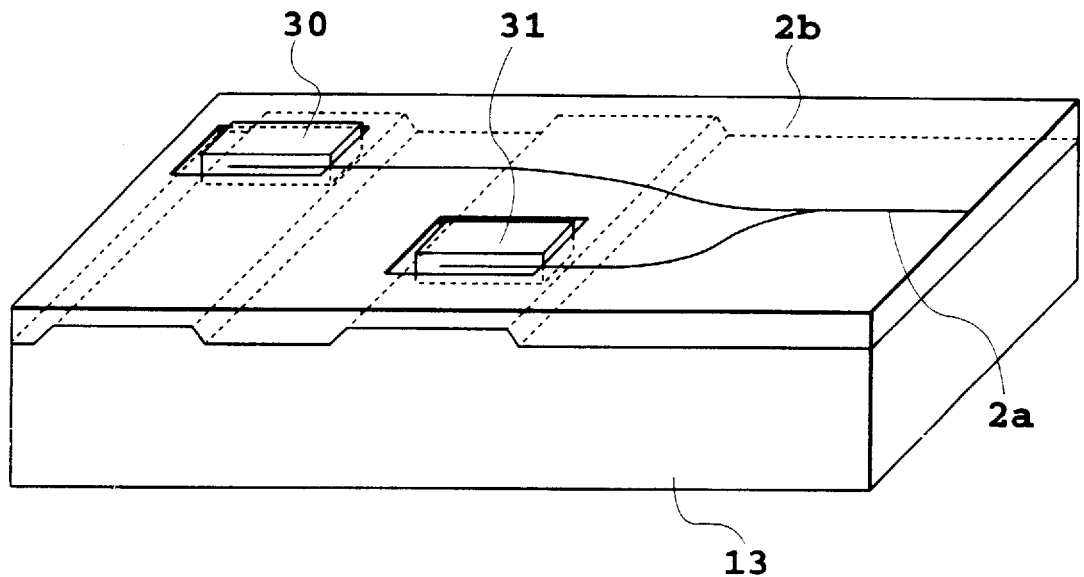
FIGS. 14A and 14B are diagrams showing the construction of the optical module of an embodiment 11 of the present invention.
Figure 14B:
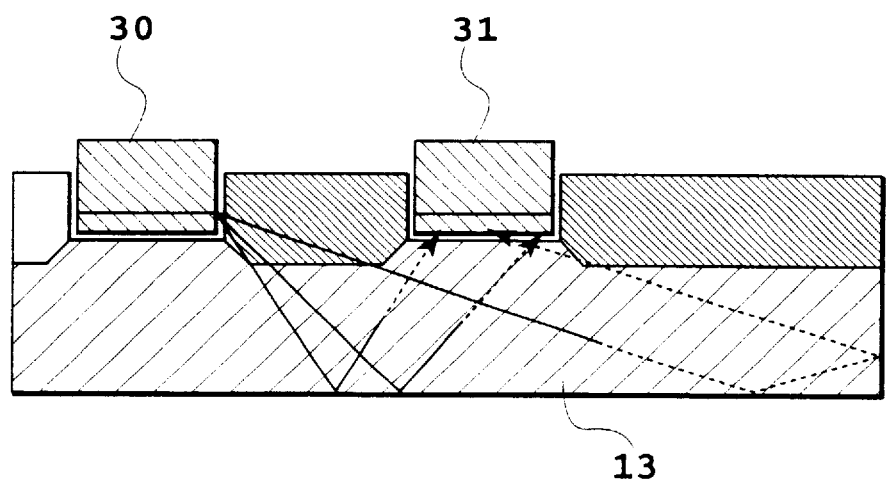
Figure 15:
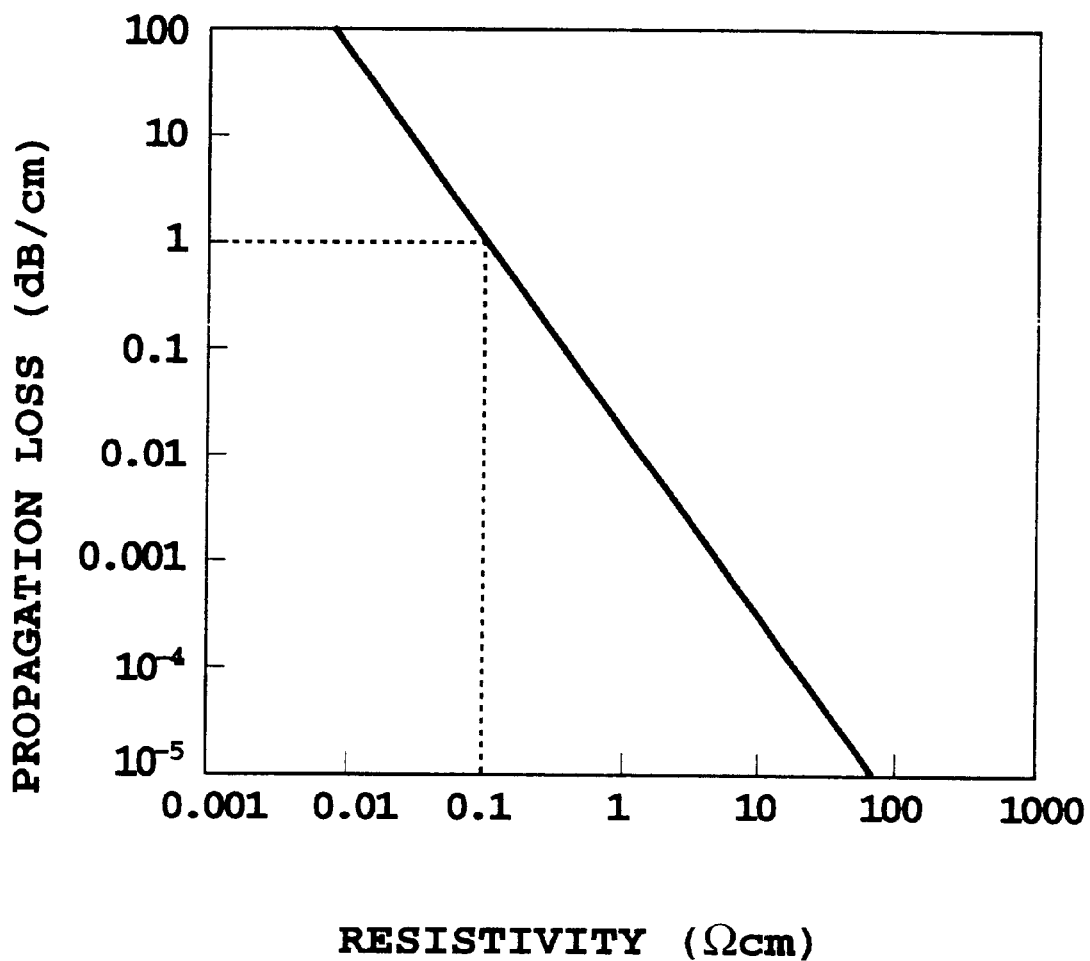
FIG. 15 is a diagram showing changes in propagation loss at 1.3 to 1.5 μm wavelength region against electrical resistivity.

FIGS. 14A and 14B are diagrams for explaining an embodiment 11 of the optical module according to the present invention, in which silica glass optical waveguide core part 2a and cladding part 2b are formed on a Si substrate 13, and a light emitting device 30 and a light receiving device 31 are disposed. The module structure of the present embodiment differs from the embodiment 10 in that the substrate is Si. In the present embodiment, as shown in FIG. 15, transmission of stray lights is suppressed utilizing a property of Si that an absorption coefficient rapidly increases with increasing conductive carrier density (see, for example, R. D. Soref et al., "Electrooptical Effects in Silicon", IEEE J. Quantum Electron., vol. QE-23, No. 1 (1987).

FIG. 15 shows changes in propagation loss in 1.3 to 1.5 µm wavelength regions against electrical resistivity. It can be seen from the Figure that when an absorption of more than 1 dB/cm is expected, an electrical resistivity of less than about 0.1 Ωcm may be sufficient. In the present embodiment, the electrical resistivity was set to about 0.01 Ωcm aiming at about 5 dB/cm to attenuate stray lights leaking into the Si substrate 13. In this case, since the module size is about 2 cm, by the above arrangement, noise due to stray lights transmitting in the Si substrate could be suppressed by about 10 dB. As described, in the optical waveguide using a semiconductor substrate, stray lights leaking to the substrate can be efficiently reduced by adjusting the carrier density.

Embodiment 12

Figure 16A:
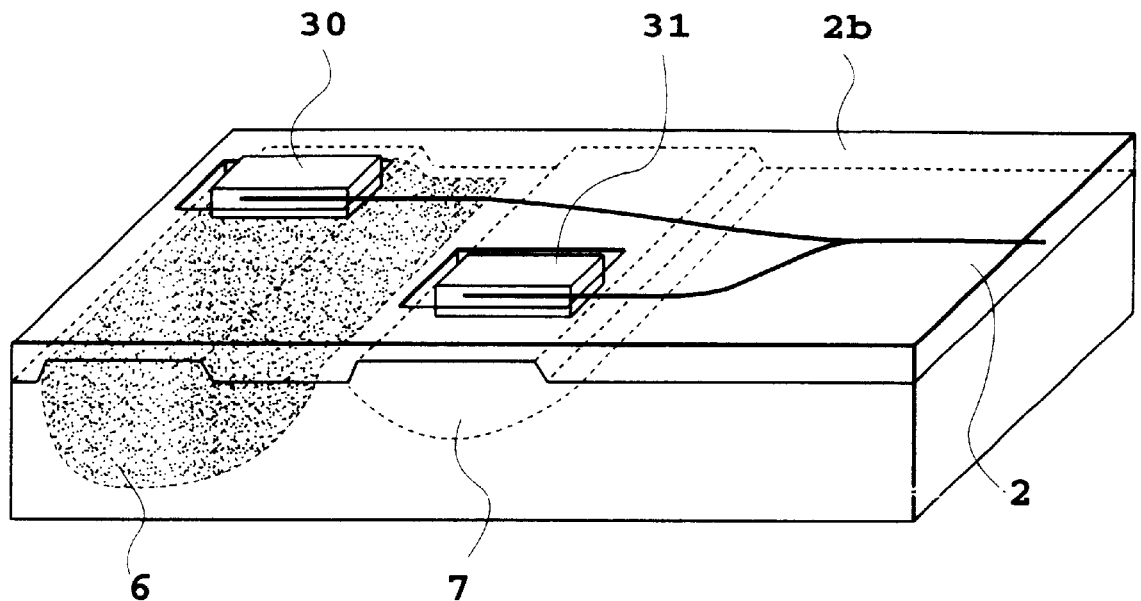
FIGS. 16A and 16B illustrate a modified example of the embodiment of FIGS. 14A and 14B, showing an embodiment 12.
Figure 16B:
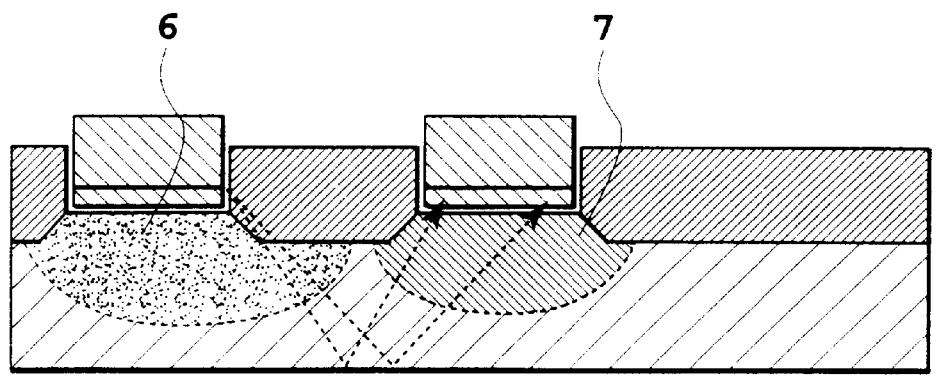

The structure shown in FIGS. 16A and 16B shows a module, which, in the optical module of embodiment 11, the lower side of the light emitting device is set to a low resistance of 0.005 Ωcm and the lower side of the light receiving device is set to a high resistance of 1 kΩcm. Local resistance distribution can be simply achieved by a typical semiconductor process. For example, local resistivity can be easily changed by locally implanting ions by a photolithography process and an ion implantation process.

By this arrangement, light is strongly absorbed in the silicon substrate part in the vicinity of the light emitting device, and when the value sufficiently absorbs light, it is not necessary to reduce resistance of other silicon substrate parts, which is indicated by the dotted line.

In the present embodiment, in order to sufficiently absorb stray lights even in a very narrow area, a low-resistance part 6 of about 0.01 Ωcm was formed.

For the light receiving device to receive a high-speed signal, a capacitance reduction of the electrical wiring part is necessary. Therefore, by forming the silicon substrate part in the vicinity of the light receiving device to be a high resistance area 7 as shown in FIGS. 16A and 16B, degradation in optical module characteristics associated with the low resistance can be suppressed. In the present embodiment the absorption area is about 1 cm in width, which provided an optical crosstalk in the optical module of about 5 dB.

Embodiment 13

Figure 17:
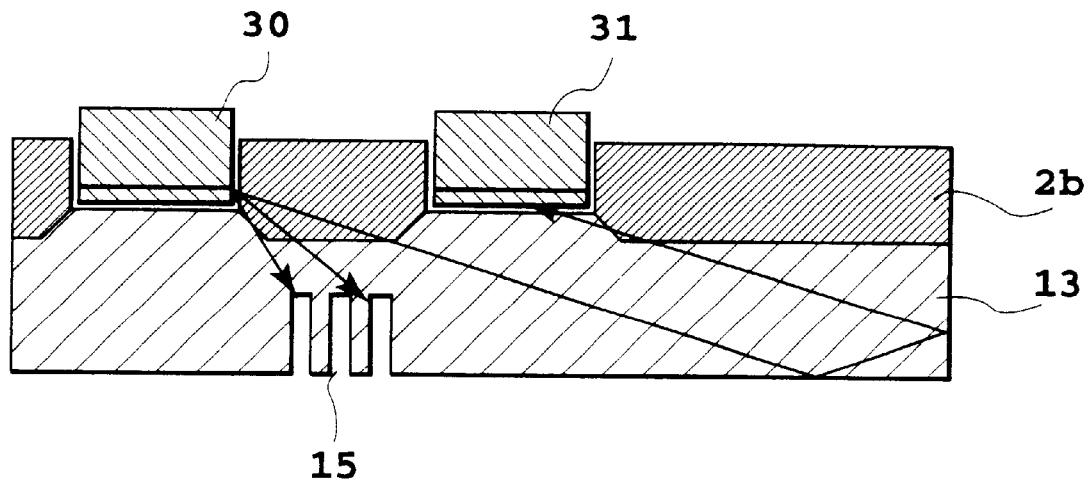
FIG. 17 is a further modified example of the embodiment of FIGS. 14A and 14B, showing an embodiment 13.

FIG. 17, as in the case of FIG. 14A, is a diagram for explaining an embodiment 13 of an optical module according to the present invention, in which silica glass optical waveguide core part 2a and cladding part 2b are formed on a Si substrate 13. and a light emitting device 30 and a light receiving device 31 are disposed. Since, due to the property of Si, a non-doped substrate is transparent to the light of 1.3 μm and 1.55 μm as communication wavelengths, stray lights leaking into Si transmit almost without propagation loss and repeat reflections at a side or bottom surface of the module to enter the light receiving device 31, resulting in noises.

Figure 18:
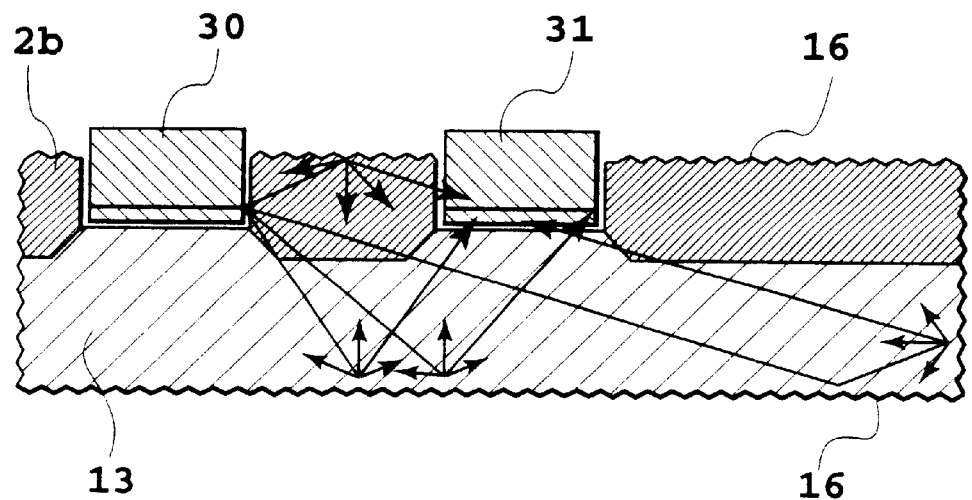
FIG. 18 is a still further modified example of the embodiment of FIGS. 14A and 14B.

In the present embodiment, grooves 15 are formed on the bottom surface of the Si substrate 13 to block transmission of light in Si (FIG. 17), or fine irregularities are formed on the bottom surface or the bottom and side surfaces of the Si substrate to diffuse reflected lights transmitted in Si so that they do not enter the light receiving device 31 (FIG. 18). In the latter case, it is even further effective to form fine irregularities also on the surface of the cladding part 2b. Formation of irregularities can be performed using plasma etching.

By the above arrangement, noise considered to be originated in stray lights could be suppressed by about 10 dB. As described, in the optical waveguide using a semiconductor substrate, by the structure provided with grooves on the substrate back surface and the structure with roughened surface, stray lights can be efficiently reduced. Further, since, by the structure provided with grooves formed on the substrate back surface, optical noise can be suppressed, and impedance can be increased between the light emitting device and the light receiving device of the substrate, an effect to suppress an electrical crosstalk is also obtained.

Embodiment 14

Figure 19:
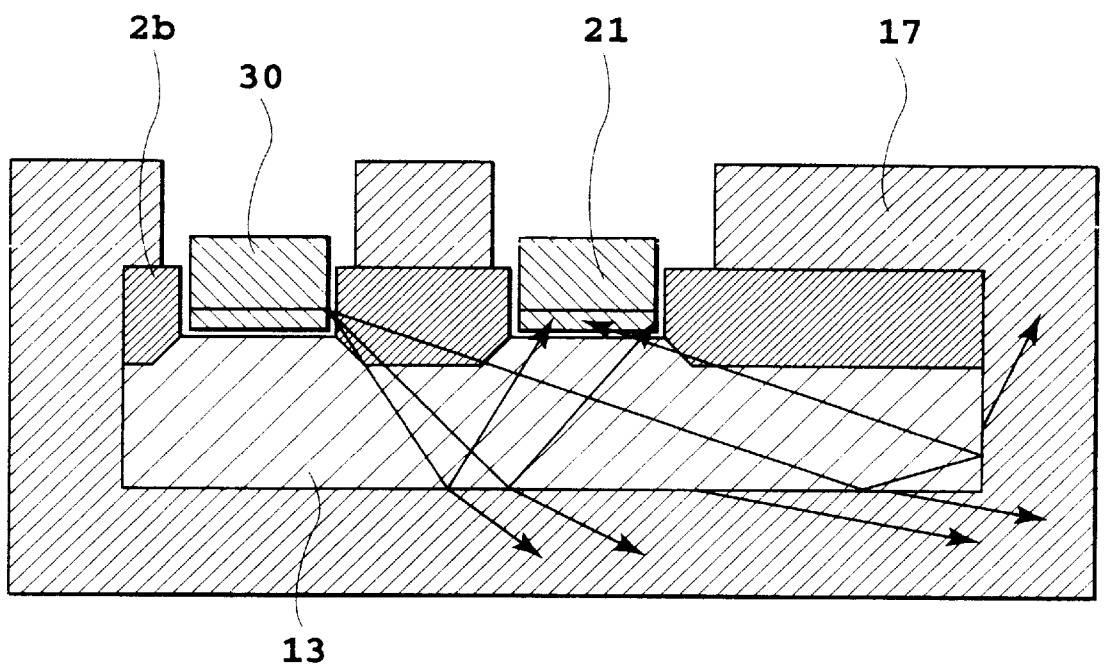
FIG. 19 is a yet further modified example of the embodiment of FIGS. 14A and 14B, showing an embodiment 14.

FIG. 19, as in the case of FIG. 14A, is a diagram for explaining an embodiment 14 of an optical module according to the present invention, in which silica glass optical waveguide core part 2a and cladding part 2b are formed on a Si substrate 13. and a light emitting device 30 and a light receiving device 31 are disposed. In the present embodiment, by forming a resin layer 17 containing a light absorbent on the periphery of the optical module, stray lights are absorbed by the surface of the module, thereby suppressing reflection of stray lights at the surface. In the present embodiment, a black epoxy resin containing a filler is used as the resin, which is coated on the periphery of the optical module. Since epoxy resin is about 1.5 in refractive index, silica is 1.5, and Si is about 3.5, stray lights can be suppressed at the interface between the resin and Si by about 1.4 dB compared with the case of air, and almost perfectly at the interface between the resin and silica waveguide cladding. As described above, by forming the resin layer 17 containing a light absorbent on the periphery of the optical module, noise considered to be due to stray lights can be efficiently suppressed.

Embodiment 15

Figure 20:
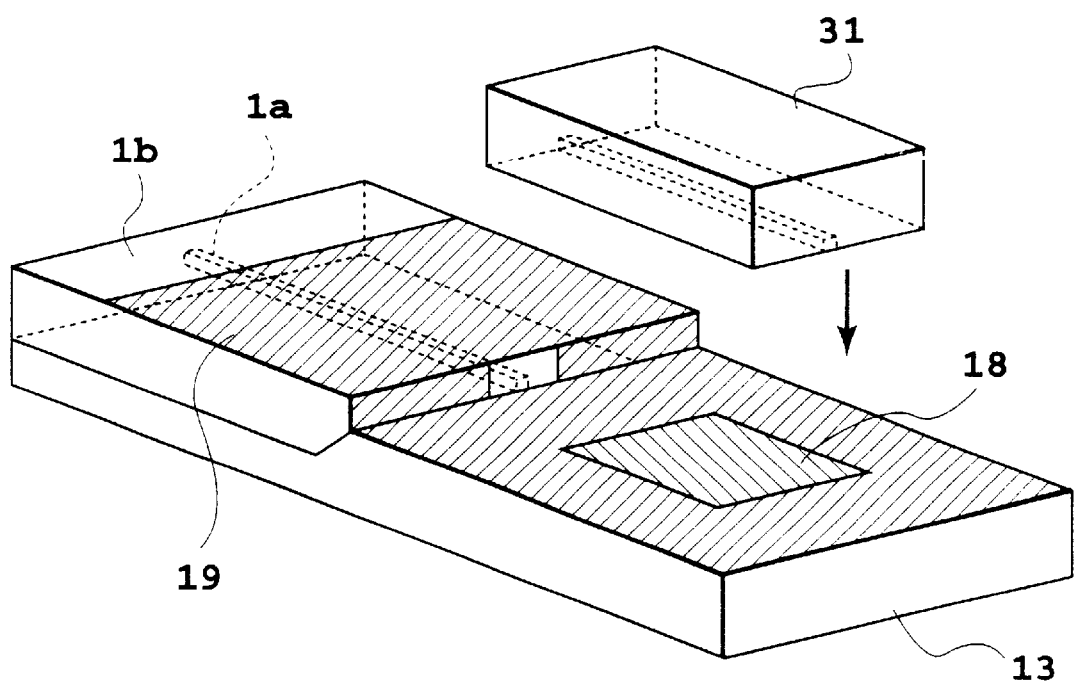
FIG. 20 is a diagram showing the construction of the optical module according to an embodiment 15 of the present invention.

FIG. 20, as in the case of FIG. 14A, is an enlarged diagram of a portion where a light receiving device 31 is mounted in an embodiment 15 of an optical module according to the present invention, in which silica glass optical waveguide core part 2a and cladding part 2b are formed on a Si substrate 13, and a light emitting device 30 and the light receiving device 31 are disposed. In the Figure, 18 indicates a portion provided with electrical wiring and a solder layer for mounting the light receiving device 31, and other hatched portions 19 are those on which a portion blocking layer is formed. In the present embodiment, a light blocking layer 19 comprising a metal is provided on the periphery of the portion where the light emitting device 30 and the light receiving device 31 are mounted. The portion indicated by 18 is also naturally light blocked. In the part shown, a light blocking layer is formed to block stray lights from below and lateral direction of the light receiving device 30. Similarly for the light emitting device 30, a light blocking layer may be formed to block entrance of lights not coupled with the optical waveguide core 2a into the cladding 2b or the substrate 13.

The above structure is not necessarily provided on the optical waveguide substrate or cladding part, instead, the part of the light receiving device other than receiving lights from the optical waveguide may be covered. Further, the light blocking layer to block lights may be other than a metal film. In particular, use of a light absorbing coating film can be expected to provide an effect to suppress diffuse reflection of lights. As described above, by using a light blocking layer, stray lights reaching the light receiving device can be efficiently suppressed.

Embodiment 16

Figure 21:
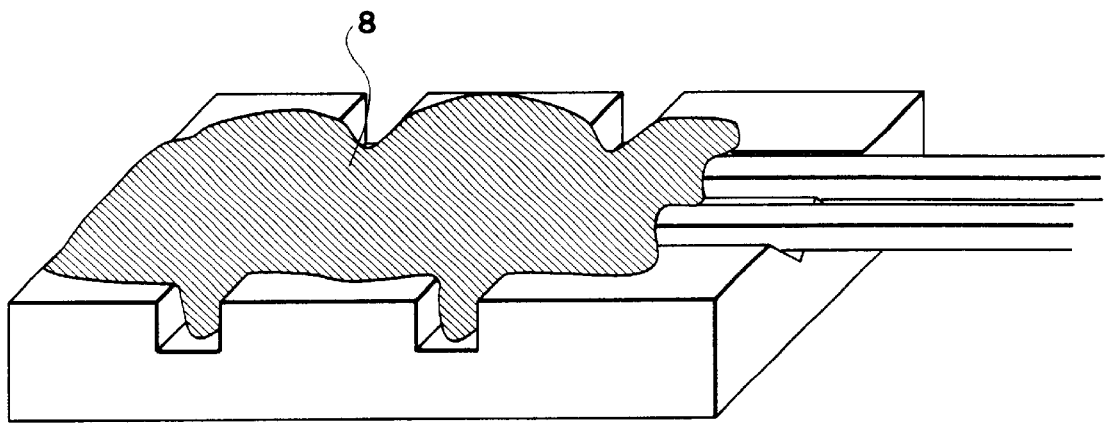
FIG. 21 is a perspective view showing an embodiment 16 of the present invention in the construction of FIG. 12A, the entire device being covered with a light absorbent resin.
Figure 22:
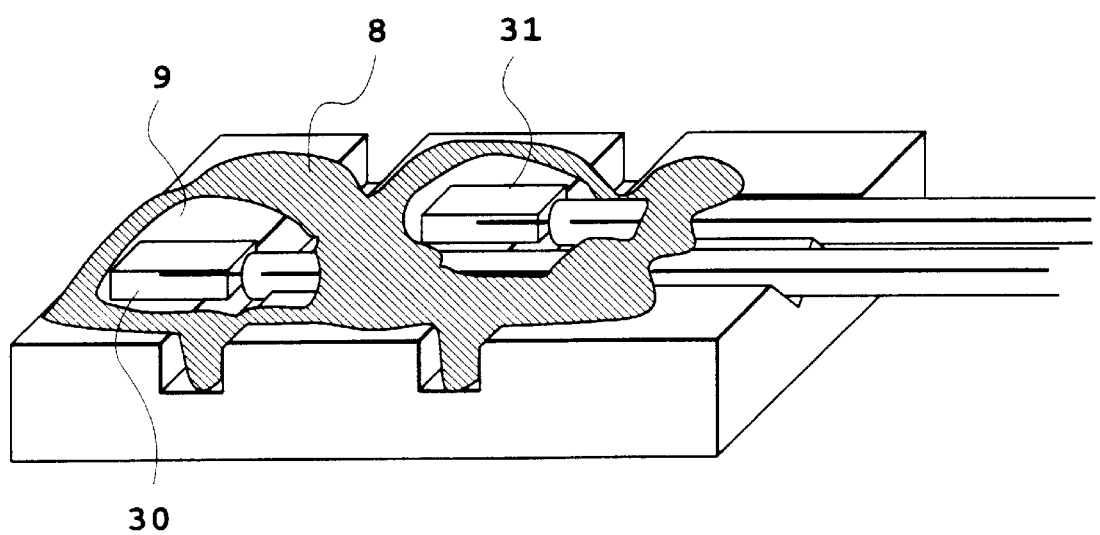
FIG. 22 is an exploded view showing parts of inside construction of FIG. 21.

FIG. 21 shows the optical module construction of an embodiment 16 according to the third aspect of the present invention. The structure according to the present embodiment is based on the optical module of the embodiment of FIGS. 12A and 12B, a resin as a light absorbent is coated on the substrate surface of the module to cover the optical devices and optical fibers. For explanation, in FIG. 22, the part where the resin is applied is removed. The structure is described in detail in the following.

The periphery of optical devices is all coated with a transparent resin 9 so that there is no loss in coupling with the optical fibers. Here, it is important that the transparent resin is divided between two devices.

By virtue of this arrangement, when the light absorbent 8 is coated on the substrate surface, the light absorbent 8 can flow into the divided part of the transparent resin 9, thereby blocking leakage lights from the light emitting device 30 passing over the substrate and reaching the light receiving device 31.

When the substrate surface is not coated with the light absorbent, an optical crosstalk of only about −23 dB was obtained, however, by using the structure of the present embodiment, a good low optical crosstalk module of about −38 dB was obtained. Further, these transparent or light absorbent resins have an effect to seal the optical devices or fix the optical fibers.

Embodiment 17

Figure 23:
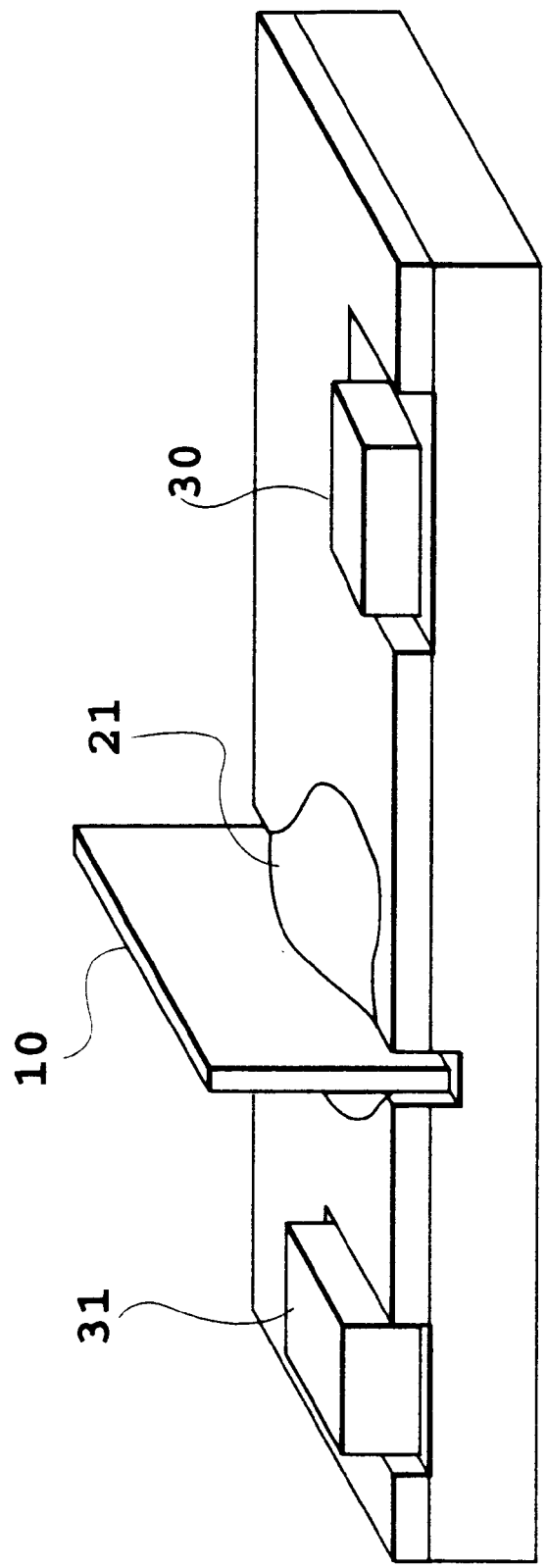
FIG. 23 shows a configuration of the optical module before providing the structure for suppressing leakage lights, wherein an optical waveguide such as an optical fiber is omitted for simplicity.
Figure 24:
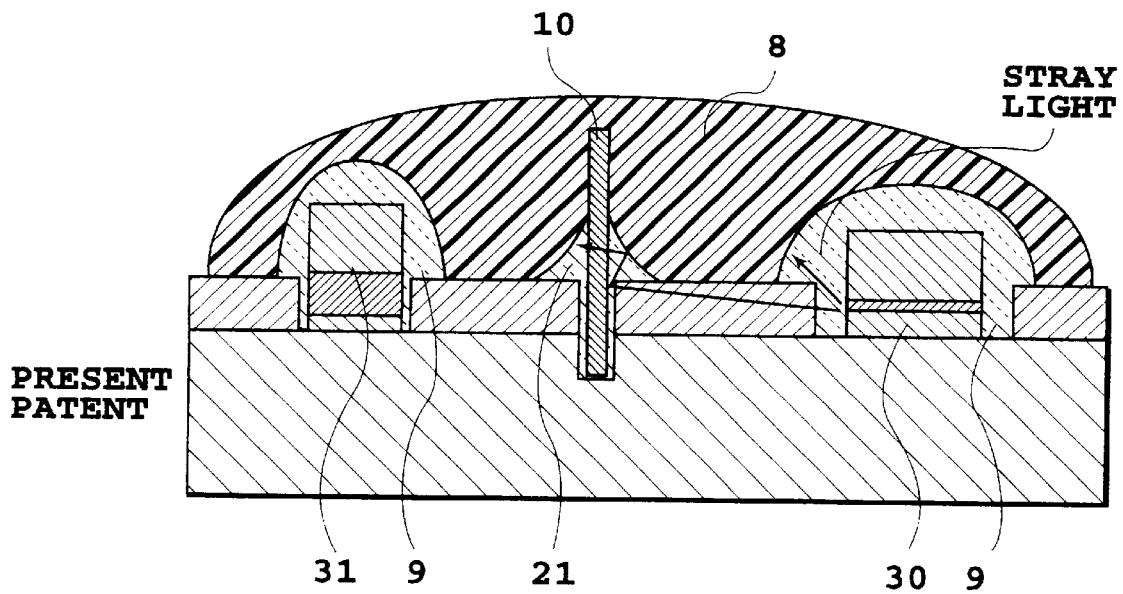
FIG. 24 is a diagram showing an embodiment 17 in which a light absorbent resin is coated including a filter.
Figure 32A:
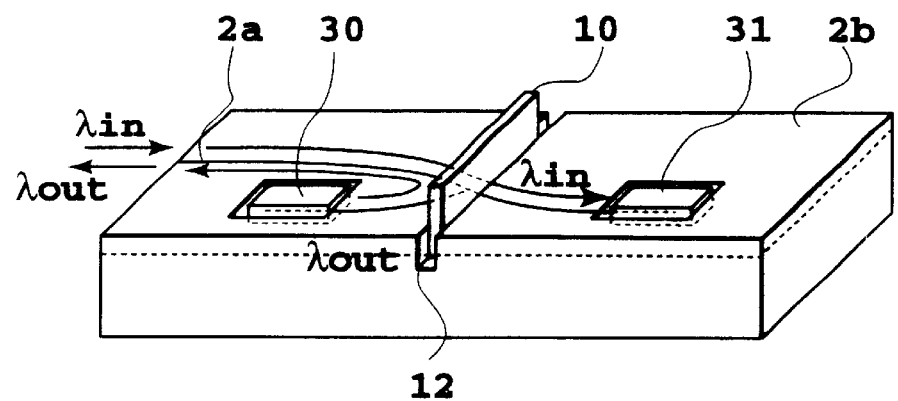
FIGS. 32A to 32C are diagrams for explaining a method using a wavelength selective filter.
Figure 32B:
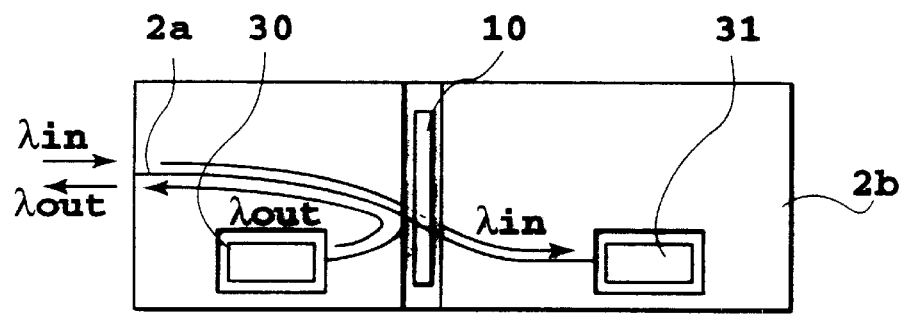

FIGS. 23 and 24 show the circuit construction of an optical module according to an embodiment 17. In the Figures, the optical waveguide is not shown since it is almost unrelated to the present embodiment. The basic construction of the optical circuit is same as in FIGS. 32A and 32B.

Figure 32C:
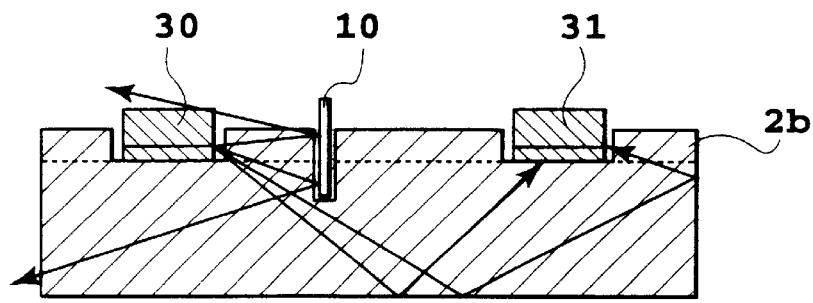

In the circuit construction of the optical module, there exists a filter 10 in addition to the light emitting device 30 and the light receiving device 31. Leakage lights (as indicated by arrows in FIG. 32C) emitted from the light emitting device are strongly scattered by the filter part to transmit from above the waveguide substrate to the light receiving device, resulting in degraded reception characteristics. Then, in the present embodiment, using the same method as in embodiment 16 as shown in FIG. 24, the substrate surface including the optical filter 10 is coated with the light absorbent. Reference numeral 21 indicates a filter fixing adhesive.

By virtue of this arrangement, since the lights emitted from the optical filter 10 or the light emitting device 30 to the space above are absorbed by the resin 8 as the light absorbent, they do not reach the light receiving device, thus obtaining good reception characteristics. With this structure, when the substrate surface is not coated with the light absorbent, only an optical crosstalk of about −22 dB was obtained, whereas by the use of the structure of the present embodiment, a good low crosstalk module of about −41 dB was obtained.

Embodiment 18

Figure 25:
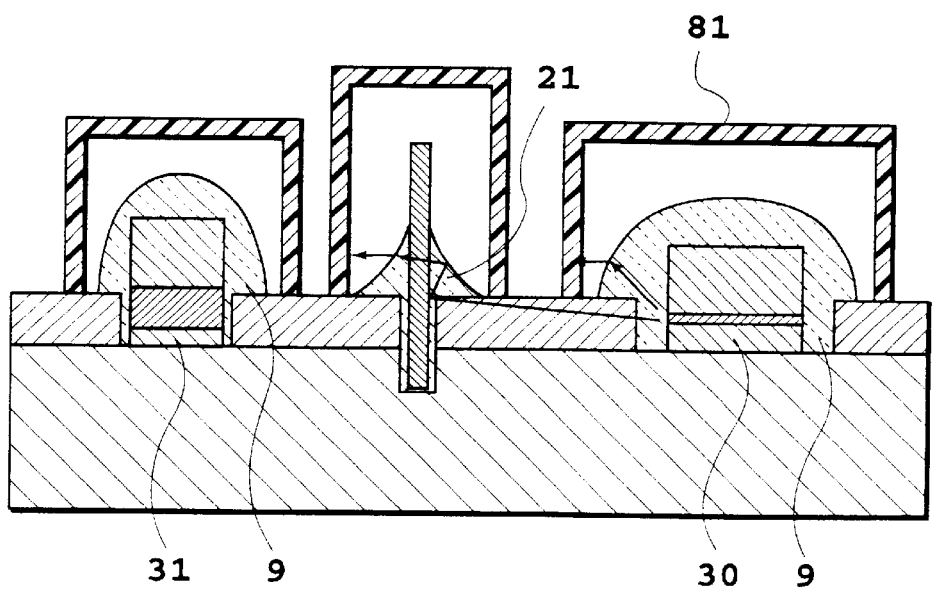
FIG. 25 is a diagram showing an embodiment 18 provided with caps as a light blocking body on respective optical devices and filter.
Figure 26:
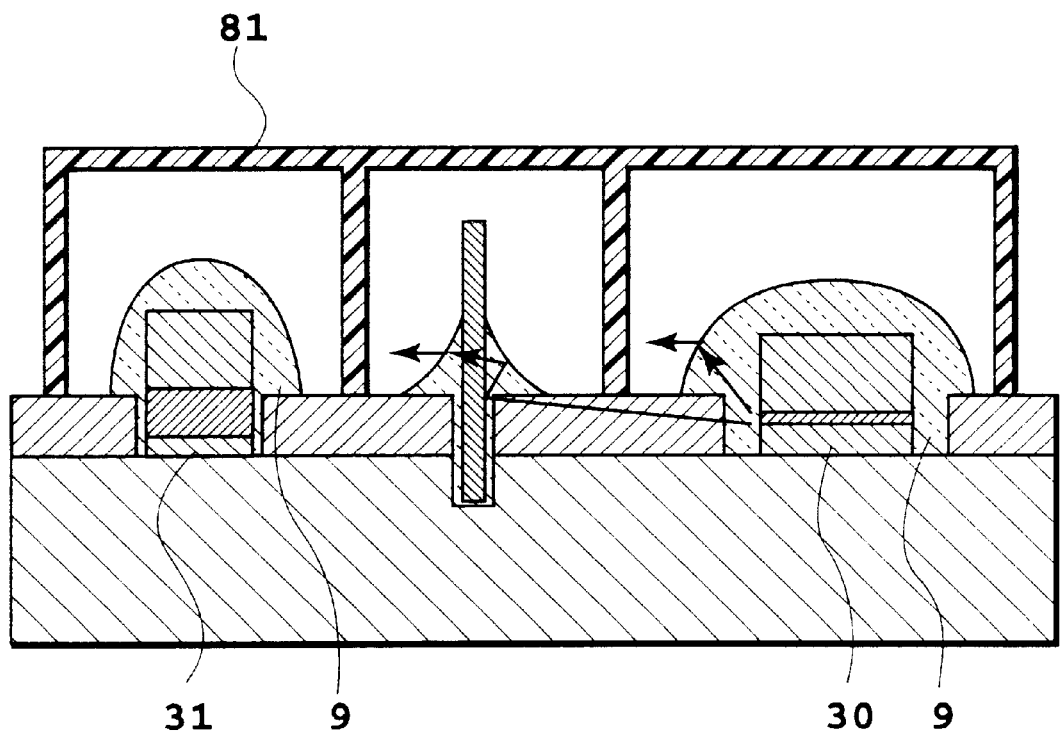
FIG. 26 is a diagram showing an embodiment 19 in which the entire construction is covered with a single cap, rather than using discrete caps shown in FIG. 25.
Figure 27A:
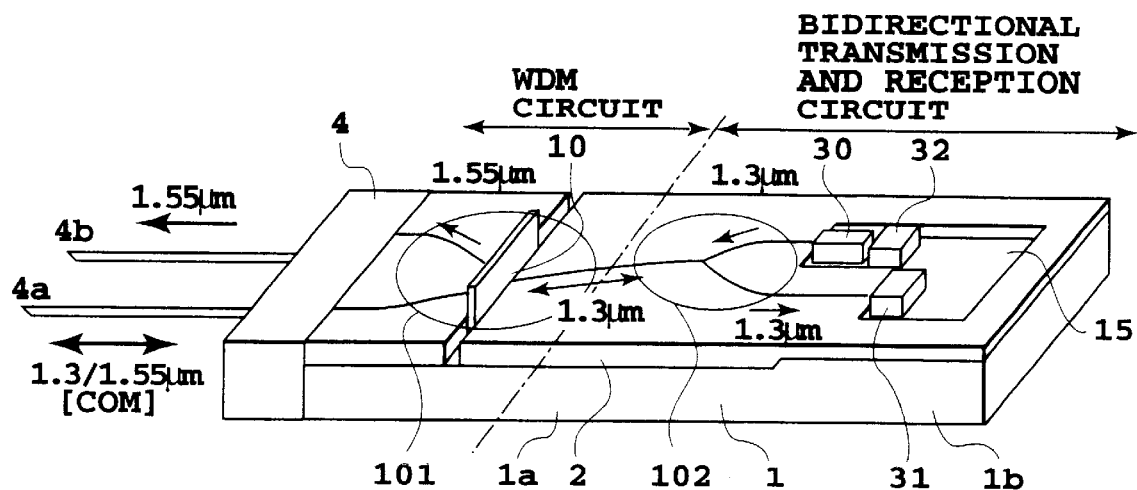
FIGS. 27A and 27B are diagrams showing the construction of a prior art optical module.
Figure 27B:
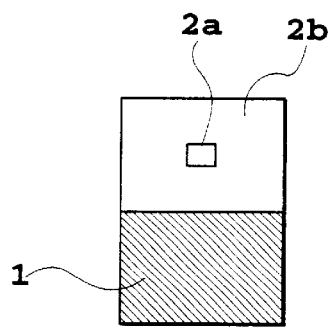
Figure 28:
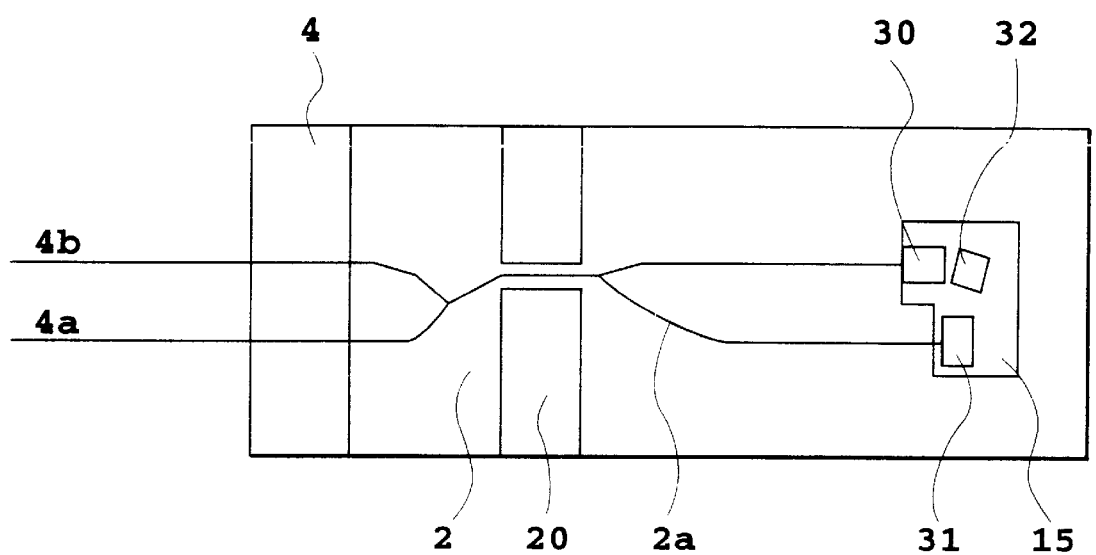
FIG. 28 is a plane diagram showing the construction of an example of prior art optical module provided with a light blocking area.
Figure 29:
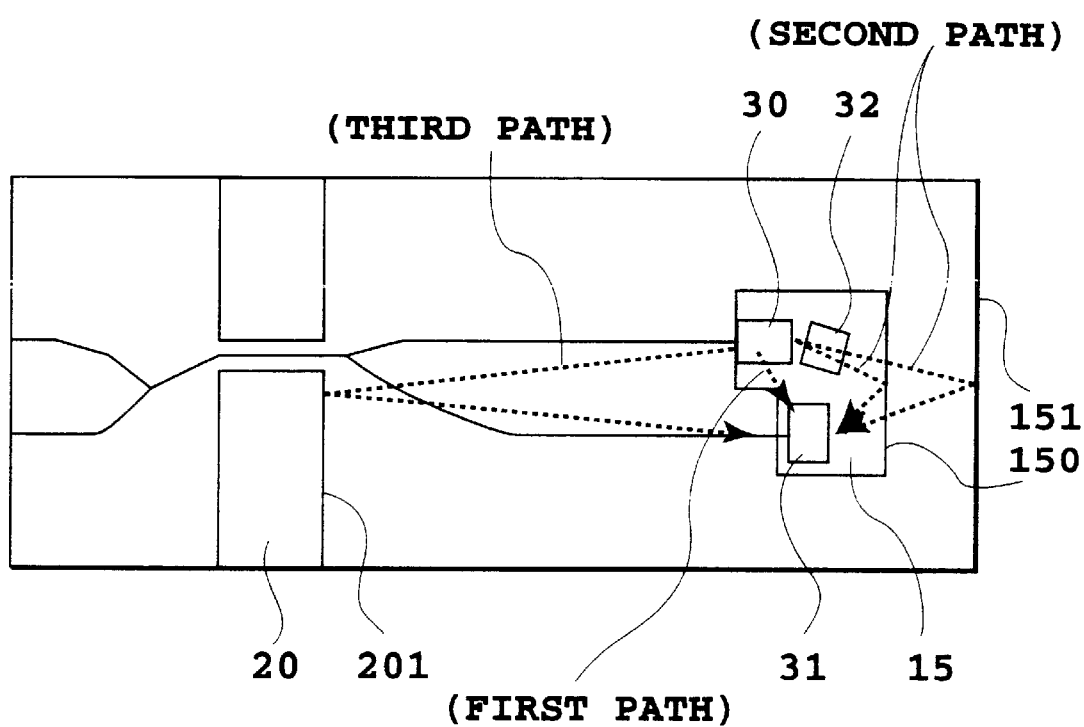
FIG. 29 is a plane diagram for explaining a leakage light generation circuit in a prior art optical module.
Figure 30A:
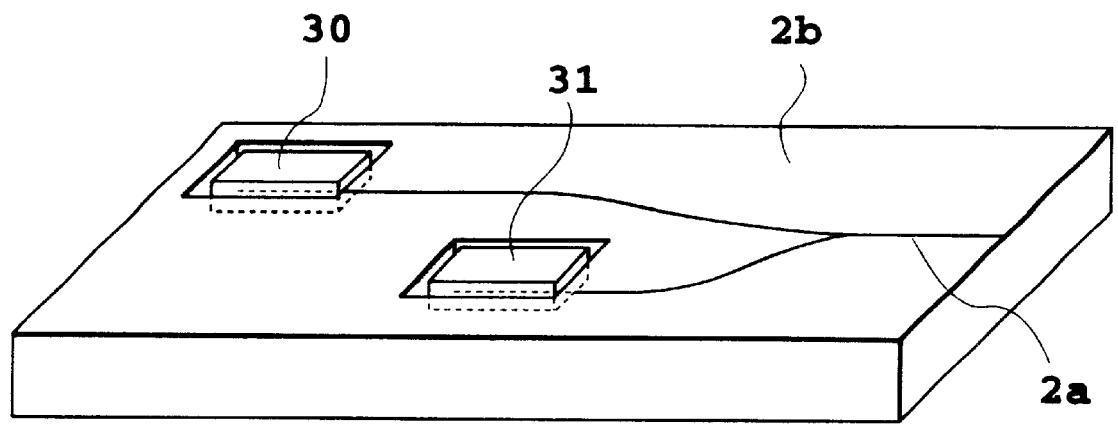
FIGS. 30A and 30B are diagrams for explaining the state of leakage lights entering the light receiving device in the optical module.
Figure 30B:
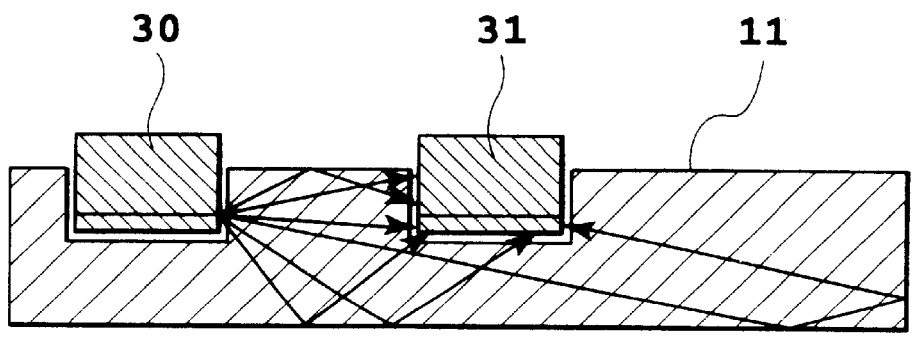
Figure 31A:
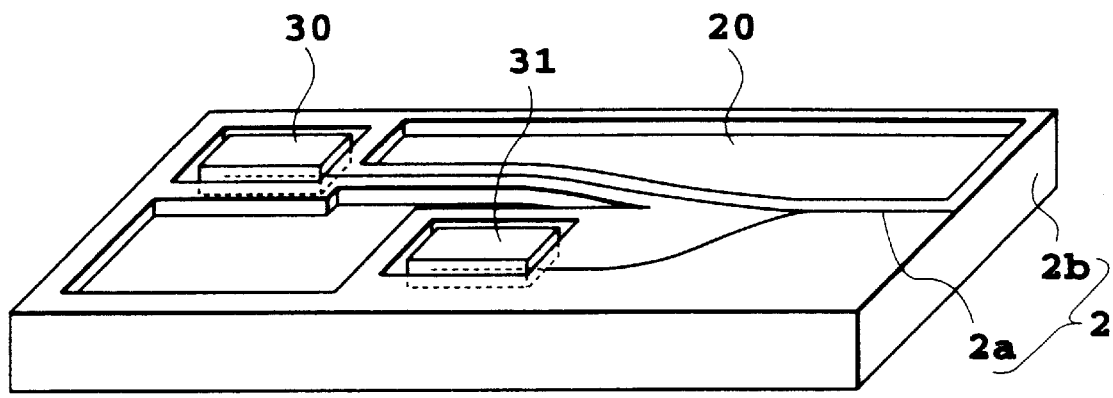
FIGS. 31A and 31B are diagrams for explaining a method for blocking lights transmitting through a cladding part.
Figure 31B:
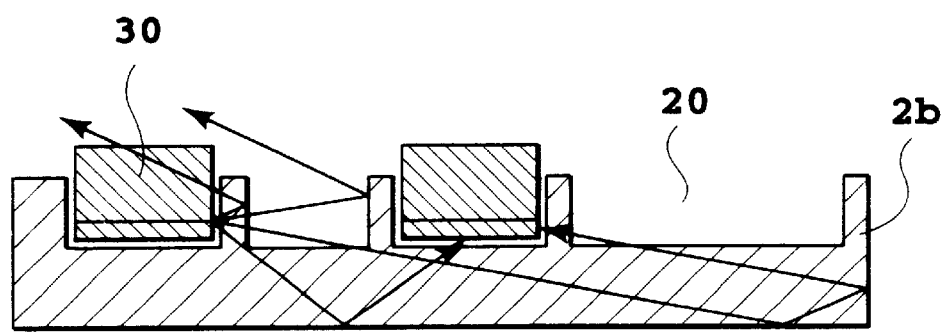

FIG. 25 shows a construction in which each of optical devices 30 and 31 and an optical filter 10 are covered with a light blocking cap 81 as a light blocking body instead of the light absorbent.

The caps are each fixed with solder on the substrate, and provide a local sealing function. The material of the cap is airtight sintered alumina which does not transmit light. As another material, one which is surrounded by a resin or glass may be used.

Further, as the structure of the cap, in this case the three areas are covered with different caps, however, alternatively, when capped, a single cap 81 having walls in the inside for separating respective devices to suppress leakage lights may be used.

Using this structure, in an optical circuit providing only an optical crosstalk of about −22 dB when the substrate surface is not coated with the light absorbent, a good low optical crosstalk module of about −42 dB was obtained using the present embodiment.

Yet further, when the module is subjected to a humidity/thermal test, it was found to withstand a temperature of 85° C. and a humidity of 90% for more than 7000 hours, thus the cap providing airtightness and sealing effects.

The invention being thus described, it will be obvious that the same may be varied in many ways. Such modifications are not to be regarded as a departure from the spirit and scope of the invention, and all such modifications as would be obvious to one skilled in the art are intended to be included within the scope of the following claims.

What is claimed is:

1. An optical module comprising:
   a silicon substrate;
   a plurality of optical semiconductor devices and optical waveguides for performing transmission of optical signals of said optical semiconductor devices, integrated on said silicon substrate, said optical semiconductor devices being deposited on said silicon substrate, at least one of said optical semiconductor devices being a light emitting device; and
   said silicon substrate being doped with an impurity to increase the number of carriers in said silicon substrate, so that stray light components of output light from said light emitting device, which do not optically couple with an optical waveguide are inhibited from reaching a vicinity of other optical semiconductor device or coupling with other optical waveguide in a manner that suppresses optical crosstalk between said plurality of optical semiconductor devices.

2. The optical module as claimed in claim 1, wherein said optical waveguide comprises a core part for coupling said semiconductor optical devices with each other on said substrate and a peripheral cladding layer of said core part.

3. The optical module as claimed in claim 2, wherein an electrical resistivity of one part or all of said silicon substrate is 0.1 $\Omega$cm or less.

4. An optical module comprising:
   a silicon substrate;
   a plurality of optical semiconductor devices and optical waveguides for performing transmission of optical signals of said optical semiconductor devices, integrated on said silicon substrate; and
   said silicon substrate being doped with an impurity to increase the number of carriers in said silicon substrate, in a manner that suppresses optical crosstalk between said plurality of optical semiconductor devices; and
   wherein a lower part of a light receiving device of said optical semiconductor is made high in resistance and a lower part of a light emitting device of said optical semiconductor is made low in resistance.

5. The optical module as claimed in claim 4, wherein an electrical resistivity of a lower part of said optical semiconductor light emitting device is within a range from 0.005 to 0.01 $\Omega$cm.

6. The optical module as claimed in claim 1, wherein said optical waveguides are optical fibers coupled with said semiconductor devices.

7. The optical module as claimed in claim 6, wherein an electrical resistivity of one part or all of said silicon substrate is 0.1 $\Omega$cm or less.

8. An optical module comprising:
   a silicon substrate;
   a plurality of optical semiconductor devices and optical waveguides for performing transmission of optical signals of said optical semiconductor devices, integrated on said silicon substrate;
   said silicon substrate being doped with an impurity to increase the number of carriers in said silicon substrate, in a manner that suppresses optical crosstalk between said plurality of optical semiconductor devices;
   wherein said optical waveguides are optical fibers coupled with said semiconductor devices; and
   wherein a lower part of said optical semiconductor light receiving device is made high in resistance and a lower part of said optical semiconductor light emitting device is made low in resistance.

9. The optical module as claimed in claim 8, wherein an electrical resistivity of a lower part of said optical semiconductor light receiving device is within a range from 0.005 to 0.01 Ωcm.

10. The optical module as claimed in claim 3, wherein a plurality of grooves are formed on the back surface of said silicon substrate.

11. The optical module as claimed in claim 3, wherein fine irregularities are formed on the surface of said silicon substrate.

12. The optical module as claimed in claim 3, wherein a light absorbent layer is formed on the surface of said silicon substrate.

13. The optical module as claimed in claim 3, wherein a light blocking layer is formed on a part of the surface of optical semiconductor devices other than an optical coupling part of said optical waveguide with said plurality of optical devices.

14. The optical module as claimed in claim 2, wherein said optical waveguide is an embedded type optical waveguide of a shape in which said core part is embedded with said cladding layer, and a rear side wall of a recess formed in said cladding layer is formed not to be perpendicular to an optical axis of said semiconductor device.

15. The optical module as claimed in claim 1, wherein said cladding layer other than the vicinity of said core part is removed to form a further light blocking area in front or rear of said recess in such a manner that said optical waveguide is not divided.

16. The optical module as claimed in claim 2, wherein said optical waveguide is an embedded type optical waveguide of a shape in which said core part is embedded with said cladding layer, and said recess formed in said cladding layer is covered with a transparent resin.

17. The optical module as claimed in claim 2, wherein said optical waveguide is an embedded type optical waveguide of a shape in which said core part is embedded with said cladding layer, a light blocking area formed at the rear of said recess formed in said cladding layer is filled with a black light blocking substance, and a side wall thereof is set obliquely.

18. The optical module as claimed in claim 2, wherein said optical waveguide is an embedded type optical waveguide of a shape in which said core part is embedded with said cladding layer, having a plurality of recesses formed in said cladding layer, of which between those as least disposed side by side in a longitudinal direction of said optical waveguide, a light blocking area is formed by removing said cladding layer other than the vicinity of said core of said optical waveguide in such a manner that said optical guide is not divided.

19. The optical module as claimed in claim 18, wherein a rear side wall of said recess is formed not to be perpendicular to the optical axis of said semiconductor optical device.

20. The optical module as claimed in claim 18, wherein a side wall of said light blocking area is formed not to cross at right angles with the optical axis of said semiconductor optical device.

21. The optical module as claimed in claim 2, wherein each periphery of said optical semiconductor devices is locally covered with a transparent resin, and the entire surface of said silicon substrate is coated with a light absorbent.

22. The optical module as claimed in claim 2, wherein said optical module has a filter inserted in a groove formed in said optical waveguide, each of said optical semiconductor devices is locally covered with a transparent resin, and all of parts protruding upward from said optical waveguide are covered with a light absorbent.

23. The optical module as claimed in claim 2, wherein said optical module further includes a filter inserted in a groove formed in said optical waveguide, each of said optical semiconductor devices is locally coated with a transparent resin, and each of them is covered with a cap as an opaque body.

24. The optical module as claimed in claim 2, wherein said optical transmitter and receiver module further includes a filter inserted in a groove formed in said optical waveguide, each of said optical semiconductor devices is locally coated with a transparent resin, and the entire parts protruding upward from said optical waveguide are all covered with a single cap as an opaque body.

* * * * *